United States Patent [19]
Gardyne et al.

[11] Patent Number: 5,973,742
[45] Date of Patent: Oct. 26, 1999

[54] SYSTEM AND METHOD FOR PERFORMING MOTION ESTIMATION WITH REDUCED MEMORY LOADING LATENCY

[75] Inventors: Robert Gardyne, Oakland; Anoush Khazeni, Sunnyvale, both of Calif.

[73] Assignee: LSI Logic Corporation, Milpitas, Calif.

[21] Appl. No.: 08/909,296

[22] Filed: Aug. 11, 1997

Related U.S. Application Data

[63] Continuation of application No. 08/652,998, May 24, 1996, abandoned.

[51] Int. Cl.$^6$ .................................................... H04N 7/30
[52] U.S. Cl. ......................... 348/416; 348/699; 348/413; 348/420
[58] Field of Search ................................... 348/699, 420, 348/421, 700, 416, 412, 413

[56] References Cited

U.S. PATENT DOCUMENTS

| | | | |
|---|---|---|---|
| 5,030,953 | 7/1991 | Chiang | 341/172 |
| 5,512,962 | 4/1996 | Homma | 348/699 |
| 5,550,591 | 8/1996 | Rim et al. | 348/699 |
| 5,557,332 | 9/1996 | Koyanagi et al. | 348/699 |
| 5,568,203 | 10/1996 | Lee | 348/699 |

*Primary Examiner*—Brian L. Casler
*Assistant Examiner*—Luanne P. Din
*Attorney, Agent, or Firm*—Conley, Rose & Tayon

[57] ABSTRACT

A system and method for estimating motion vectors between frames of a video sequence which operates with reduced memory loading latency according to the present embodiment. The motion estimation system includes a motion port pixel processing array according to the present embodiment. The processing array includes a reference block memory array for storing a reference block and a candidate block memory array for storing a candidate block. According to the present embodiment, each of the reference block memory array and candidate block memory array are configured with dual ports to a reference block memory and a search window memory. Each of the reference block memory array and candidate block memory array are further configured to allow dual port loading during the entire initialization sequence, when one or more of either a reference block or candidate block is being loaded into the respective memory array. During initialization or loading, memory elements for each of the reference block and candidate block are loaded in parallel according to the present embodiment. This reduces the clock latency of the initial loading of the memory array as well as subsequent loadings of a new candidate block for each column of the search window. This reduces the loading to half the number of cycles as compared with prior art methods. The present embodiment thus efficiently performs motion estimation with reduced memory array loading latency. The processing array of the present embodiment is also capable of operating in either frame mode or field mode.

26 Claims, 13 Drawing Sheets

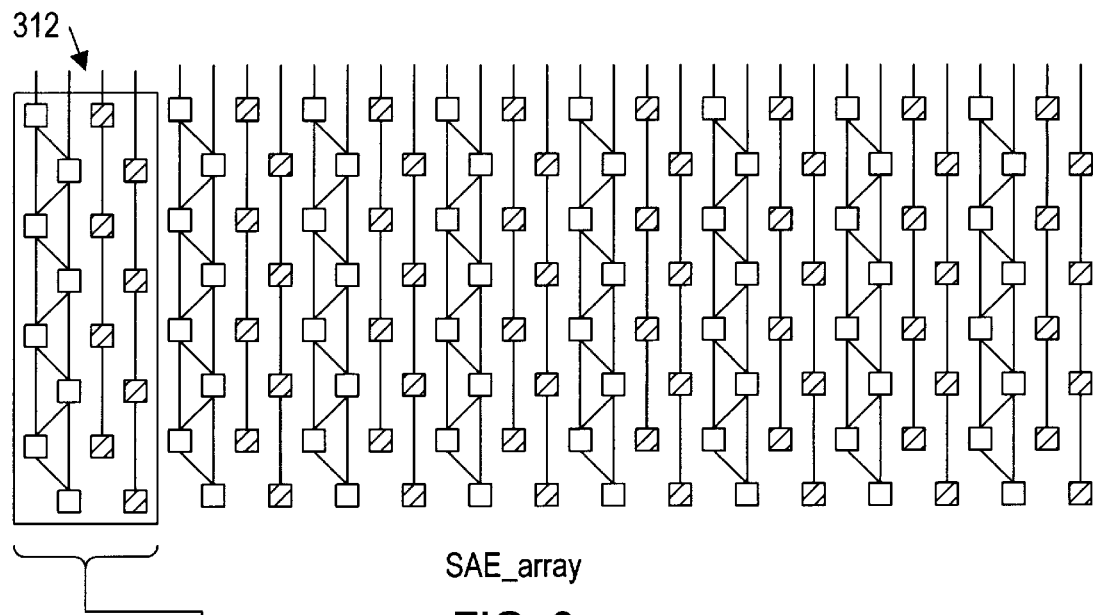
SAE_array
FIG. 9
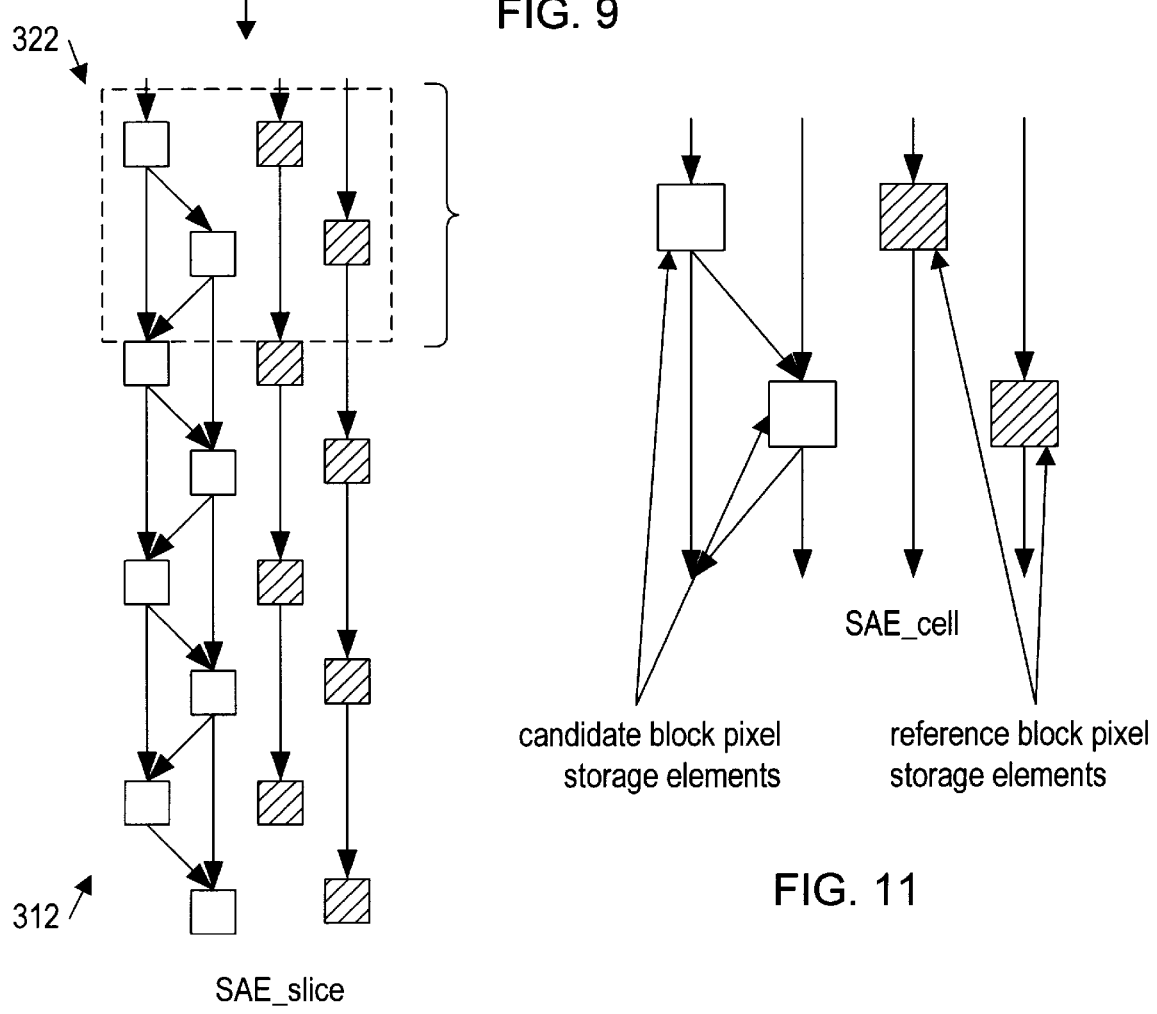
candidate block pixel storage elements
reference block pixel storage elements
SAE_cell
FIG. 11
SAE_slice
FIG. 10 data flow through SAE
slice during initialization data flow through SAE slice
during SAE computation cycles

SYSTEM AND METHOD FOR PERFORMING MOTION ESTIMATION WITH REDUCED MEMORY LOADING LATENCY

This application is a continuation of application Ser. No. 08/652,998, filed May 24, 1996 now abandoned.

INCORPORATION BY REFERENCE

The following references are hereby incorporated by reference.

The ISO/IEC MPEG specification referred to as ISO/IEC 13818 is hereby incorporated by reference in its entirety.

1. Field of the Invention

The present invention relates generally to digital video compression, and more particularly to a system for computing motion estimation vectors between video frames, wherein the system includes an improved pixel processing memory array architecture for loading pixel data in the pixel processing memory array with reduced latency.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Video compression methods for still graphic images or single video frames are referred to as intraframe compression methods, and compression methods for motion video are referred to as interframe compression methods.

Examples of video data compression for still graphic images are RLE (run-length encoding) and JPEG (Joint Photographic Experts Group) compression. The RLE compression method operates by testing for duplicated pixels in a single line of the bit map and storing the number of consecutive duplicate pixels rather than the data for the pixel itself. JPEG compression is a group of related standards that provide either lossless (no image quality degradation) or lossy (imperceptible to severe degradation) compression types. Although JPEG compression was originally designed for the compression of still images rather than video, JPEG compression is used in some motion video applications.

In contrast to compression algorithms for still images, most video compression algorithms are designed to compress full motion video. Video compression algorithms for motion video use a concept referred to as interframe compression, which involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. It is noted that the interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe compression technique described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which generally uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used for references for other frames.

In general, for the frame(s) following a reference frame, i.e., P and B frames that follow a reference I or P frame, only small portions of these frames are different from the corresponding portions of the respective reference frame. Thus, for these frames, only the differences are captured, compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe lossless compression technique. After the I frames have been created, the MPEG encoder divides each I frame into a grid of 16×16 pixel squares called macro blocks. The respective I frame is divided into macro blocks in order to perform motion compensation. Each of the subsequent pictures after the I frame are also divided into these same macro blocks. The encoder then searches for an exact, or near exact, match between the reference picture macro block and those in succeeding pictures. When a match is found, the encoder transmits a vector movement code or motion vector. The vector movement code or motion vector only includes information on the difference between the I frame and the respective succeeding picture. The blocks in succeeding pictures that have no change relative to the block in the reference picture or I frame are ignored. Thus the amount of data that is actually stored for these frames is significantly reduced.

After motion vectors have been generated, the encoder then tracks the changes using spatial redundancy. Thus, after finding the changes in location of the macro blocks, the MPEG algorithm further reduces the data by describing the difference between corresponding macro blocks. This is accomplished through a math process referred to as the discrete cosine transform or DCT. This process divides the macro block into four sub blocks, seeking out changes in color and brightness. Human perception is more sensitive to brightness changes than color changes. Thus the MPEG algorithm devotes more effort to reducing color space rather than brightness.

New digital multimedia applications such as Video-On-Demand, High Definition Television (HDTV), Direct Broadcasting System (DBS), Video Telephony, Digital Publishing, etc. require real time compression of digital video data in order for feasible processing, storage, and transmission of video. In general, an essential processing requirement in most video compression algorithms is motion estimation. As described above, motion estimation is the task of identifying temporal redundancy between frames of the video sequence.

Various methods exist for estimating motion vectors, including block matching. Block matching is used in the MPEG standard and is the most popular motion estimation method. Block matching compares each block of a reference video frame to a plurality of candidate blocks in a search window of a neighboring video frame in order to compute a motion vector. The reference video frame is partitioned into equal-sized blocks, referred to as reference blocks. Likewise, the subsequent frame is partitioned into respective search windows or search areas for each of the reference blocks which correspond to the location of the respective reference block in the reference frame. The search window is larger than the corresponding reference block to allow the block matching method to compare the reference block with different candidate blocks in the search window. Thus, block matching involves, for each reference block, searching for a similar block among the candidate blocks in the search window located in the subsequent or neighboring frame.

In the block matching method, the search is performed by measuring the closeness between the reference block and each candidate block in the search window of a subsequent or neighboring frame, and then choosing the closest match. The measure of closeness between the reference block and a candidate block generally involves computing the Sum of Absolute Errors (SAE) between the two blocks, which is the sum of the absolute differences between every corresponding pixel in the two blocks. The smaller the SAE of the two block, the closer or better match there is between the two blocks.

In general, motion estimation, i.e., the process of generating motion vectors to represent movement between blocks in respective video frames, requires a large amount of processing. Block matching motion estimation typically uses a first memory array, referred to as the reference block memory array, which stores the reference block of pixel data, and a second memory array, referred to as the candidate block memory array, which stores a candidate block from the search window of the search frame. At initialization, i.e., at the beginning of the motion estimation process for a respective reference block of a reference frame, the reference block is loaded into the reference block memory array and a first candidate block from the search window is loaded into the candidate block memory array. This initial loading requires some amount of time, and no Sum of Absolute Errors (SAE) computations can be performed during this initial loading period.

After both a reference block has been loaded into the reference block memory array and a candidate block has been loaded into the candidate block memory array, SAE computations are begun. On each cycle, a new scan line portion from the search window is loaded into the candidate memory array, and the remaining values in the candidate block memory array are shifted down in the array, thus essentially loading a new candidate block in the memory array. This is performed for each of the candidate blocks in a column of the search window. Thus, for each column of the search window, after the reference block memory array and the candidate block memory array have been loaded, an SAE computation between the reference block and a new candidate block is performed on each clock cycle. After the candidate blocks in an entire column of the search window have been searched, the data in the candidate memory array is essentially flushed, and new candidate block data from the top of the next column of the search window, i.e., one vertical pixel line over, is loaded into the candidate block memory array. Again, during the loading of the first or top candidate block from the next column of the search window, no SAE computations are performed. This latency occurs for each column of the search window.

Motion estimation arrays which perform block matching motion estimation typically operate in one of a plurality of modes. For example, pixel data may be stored in the memory wherein a first field in the memory corresponds to, for example, odd horizontal scan lines of the video frame, and a second field comprises even horizontal scan lines of the video frame. When the pixel data is stored in this mode, the motion estimation array may operate in a frame mode to receive and compare pixel data output from each of the two or more fields simultaneously, thus receiving pixel data output for the entire frame. The motion estimation array may also operate in a field mode to receive and compare pixel data output from only one of the fields. One problem with current motion estimation arrays is that generally separate engines are required to operate in field and frame mode. This requires additional die area for the separate engines and also places additional loads on the input buses.

Therefore, an improved system and method is desired for efficiently estimating motion vectors in a video compression system. An improved system and method is further desired for performing motion estimation with reduced memory loading latency as compared to prior art methods. An improved system and method is further desired which provides a single motion estimation array capable of operating in both field and frame mode.

SUMMARY OF THE INVENTION

The present invention comprises a system and method for estimating motion vectors between frames of a video sequence. The present invention preferably comprises a computer system including a video encoder which receives an uncompressed video file or video bitstream and generates a compressed or encoded video stream. In the preferred embodiment, the video encoder uses MPEG encoding techniques. The MPEG encoder includes motion estimation or compensation logic according to the present invention which operates with reduced memory loading latency according to the present invention.

The motion estimation system preferably includes a reference frame memory for storing a reference frame of video data and a search frame of memory for storing a search frame of video data. The reference frame is partitioned into various blocks, and motion estimation is performed between blocks in the reference frame and candidate blocks from a search window in the search frame. The motion estimation system further includes a multi port pixel processing array according to the present invention, also referred to as a motion estimation array or Sum of Absolute Errors (SAE) array. The SAE array includes a reference block memory array for storing a reference block and a candidate block memory array for storing a candidate block. The reference block memory array and the candidate block memory array, as well as additional logic, collectively comprise the SAE array. The SAE array performs SAE computations in the motion estimation system.

The motion estimation system operates as follows. First, a particular reference block is preferably loaded into the reference block memory array, and a first candidate block from the respective search window is loaded into the candidate block memory array. It is noted that the reference block from the reference frame and the search window from the search frame may be first loaded into separate memories, e.g., a reference block memory and a search window memory, and then the reference block and candidate block are transferred from these memories to the respective arrays. The pixel data is preferably stored in a mode comprising first and second fields for even and odd horizontal scan lines.

As discussed in the background section, the initial loading; of the reference block and candidate block in the SAE array, as well as subsequent loadings of new candidate blocks from new columns of the search window, introduces a large amount of latency in the SAE computation. According to the present invention, each of the reference block memory array and candidate block memory array are configured with dual ports to the reference block memory and the search window memory. In other words, the reference block memory array includes two input ports coupled to two output ports of the reference block memory and/or the reference frame memory, and the candidate block array includes two input ports coupled to two output ports of the search window memory and/or search frame memory.

Each of the reference block memory array and candidate block memory array are further configured to allow dual port loading during the entire initialization sequence, when one or more of either a reference block or candidate block is being loaded into the respective memory array. In the preferred embodiment, each of the reference block memory array and candidate block memory array are loaded with two vertically adjacent pixels simultaneously on each clock cycle. In frame mode, pixel data from the respective fields are provided to respective memory elements in the arrays substantially in parallel. In field mode, single port loading is used whereby pixel data from one of the respective fields is provided to respective memory elements in the array.

In the preferred embodiment, the SAE array is designed to perform comparisons between 8×8 pixel blocks in the reference block array and the candidate block array. The SAE array comprises eight SAE slices, wherein each of the eight SAE slices are comprised of four adjacent SAE cells. Each SAE cell includes two memory elements for storing two vertically adjacent pixels in the reference block, as well as two memory elements for storing two vertically adjacent pixels in the candidate block. Each of the candidate block memory elements is controllable to load pixel data from its neighboring register within the cell or from the corresponding register in the adjacent upper cell. Since the reference block memory array remains constant throughout an SAE computation of the search window, the reference block memory elements are designed to load pixel data from itself, i.e., maintain the pixel value constant during the SAE computation, or load pixel data from the corresponding memory element in the upper adjacent cell.

During initialization or loading, the two memory elements for each of the reference block and candidate block are loaded in parallel according to the present invention. This reduces the clock latency of the initial loading of the memory array as well as subsequent loadings of a new candidate block for each column of the search window. This reduces the loading to half the number of cycles as compared with prior art methods. In prior art methods, eight pixels are loaded per clock cycle in an 8×8 memory array, thus requiring eight cycles for an 8×8 block to be loaded. In the SAE memory array of the present invention, each of the reference block memory array and the candidate block memory array are essentially partitioned into two 8×4 arrays while the loading is performed, thus requiring only four cycles for loading an 8×8 block.

The present invention thus efficiently performs motion estimation with reduced memory array loading latency. The SAE array of the present invention is also capable of operating in either frame mode or field mode. Therefore, the present invention provides video encoding with improved performance.

BRIEF DESCRIPTION OF THE DRAWINGS

A better understanding of the present invention can be obtained when the following detailed description of the preferred embodiment is considered in conjunction with the following drawings, in which:

FIG. 9 is a block diagram illustrating the SAE array including a reference block array portion and a candidate block array portion;

FIG. 10 illustrates possible directions of data flow in an SAE slice of the SAE array of FIG. 9;

FIG. 11 illustrates possible directions of data flow in an SAE cell of the SAE slice of FIG. 10;

DETAILED DESCRIPTION OF THE EMBODIMENTS

Figure 1:
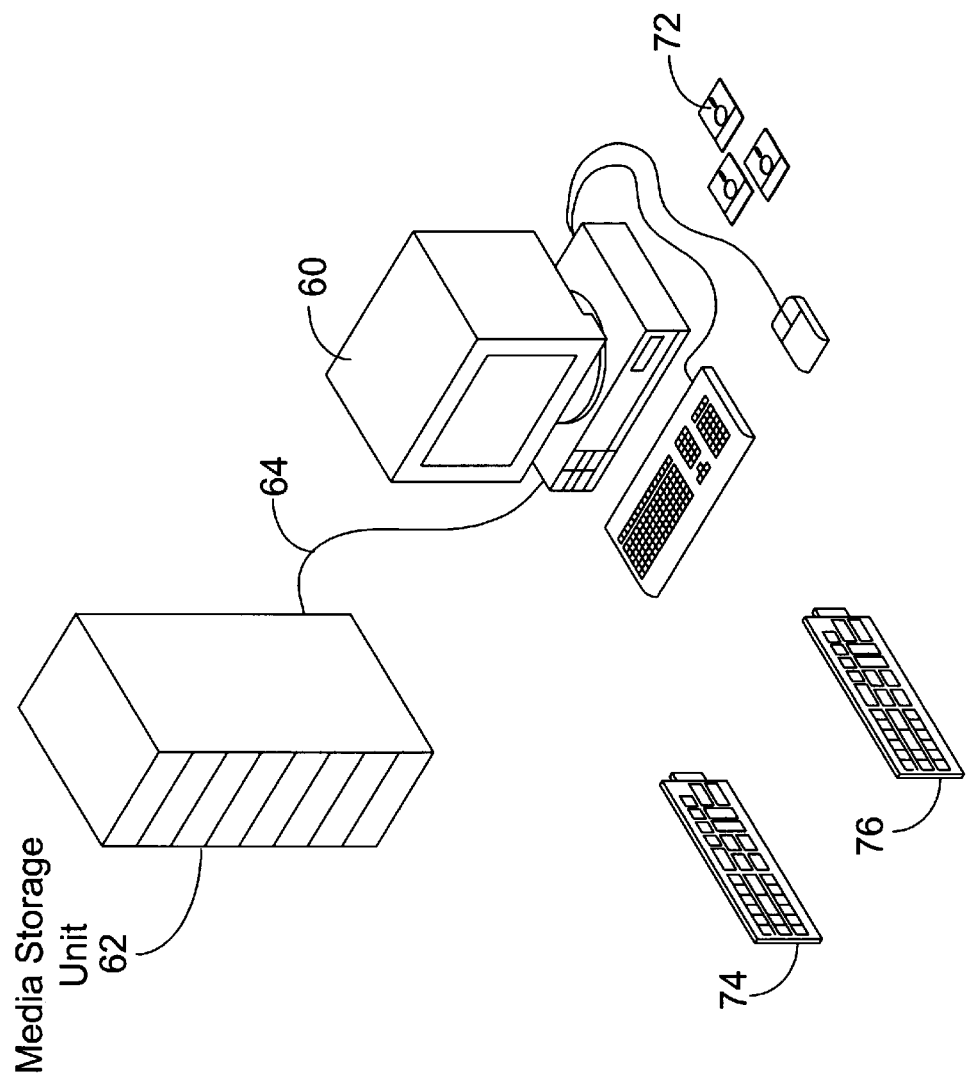
FIG. 1 illustrates a computer system which performs video compression and which includes a video encoder including multi port pixel processing array according to the present invention.

Referring now to FIG. 1, a system for performing video compression including a motion estimation system according to the present invention is shown. The system of the present invention performs motion estimation between frames of a video sequence during video encoding or video compression. In other words, the system of the present invention preferably generates motion estimation vectors for use in video compression. However, the system of the present invention may be used to generate motion vectors for use in any of various types of applications, as desired.

As shown, in one embodiment the video compression system comprises a general purpose computer system 60. The computer system 60 is preferably coupled to a media storage unit 62 which stores digital video files which are to be compressed by the computer system 60. In the preferred embodiment, the computer system 60 receives a normal uncompressed digital video file or bitstream and generates a compressed video file. In the present disclosure, the term "uncompressed digital video file" refers to a stream of raw uncompressed video, and the term "compressed video file" refers to a video file which has been compressed according to any of various video compression algorithms which use motion estimation techniques, including the MPEG standard, among others.

As shown, the computer system 60 preferably includes a video encoder 76 which performs video encoding or compression operations. The video encoder 76 is preferably an MPEG encoder. The computer system 60 optionally may also include an MPEG decoder 74. The MPEG encoder 76 and MPEG decoder 74 are preferably adapter cards coupled to a bus in the computer system, but are shown external to the computer system 60 for illustrative purposes. The computer system 60 also includes software, represented by floppy disks 72, which may perform portions of the video compression operation and/or may perform other operations, as desired.

Figure 2:
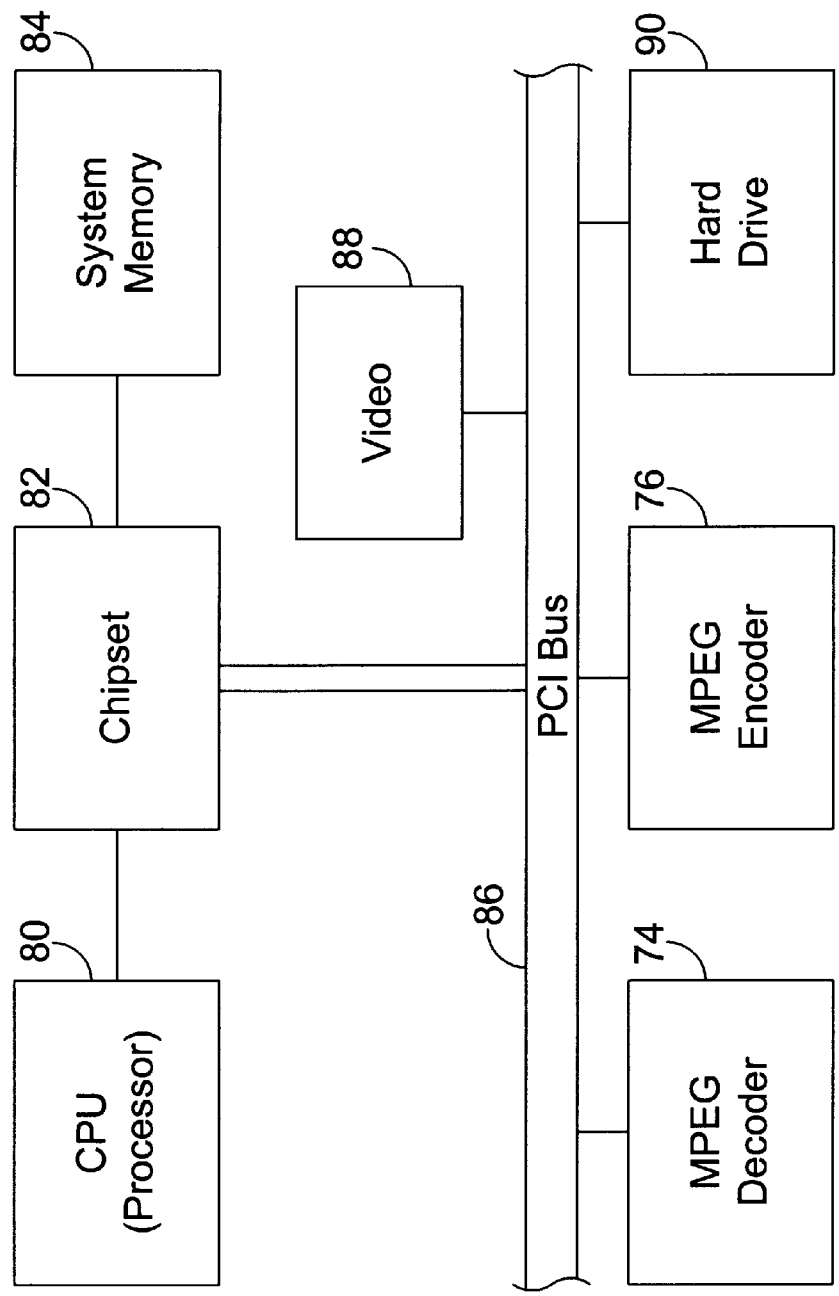
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, MPEG decoder 74 and MPEG encoder 76 are shown connected to PCI bus 86. Various other components may be comprised in the computer system, such as video 88 and hard drive 90.

As also mentioned above, in the preferred embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be compressed and/or for storing the resultant encoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the digital video file may be received from an external source, such as a remote storage device or remote computer system. In this embodiment, the computer system preferably includes an input device, such as an ATM (Asynchronous Transfer Mode) adapter card or an ISDN (Integrated Services Digital Network) terminal adapter, or other digital data receiver, for receiving the digital video file. The digital video file may also be stored or received in analog format and converted to digital data, either externally to the computer system 60 or within the computer system 60.

As mentioned above, the MPEG encoder 76 in the computer system 60 performs video encoding or video compression functions. In performing video compression, the MPEG encoder 76 generates motion estimation vectors between frames of the digital video file. As discussed further below, the MPEG encoder 76 in the computer system 60 includes a multi port pixel processing array according to the present invention which performs the motion estimation functions with reduced loading latency.

It is noted that the system for encoding or compressing video data may comprise two or more interconnected computers, as desired. The system for encoding or compressing video data may also comprise other hardware, such as a set top box, either alone or used in conjunction with a general purpose programmable computer. It is noted that any of various types of systems may be used for encoding or compressing video data according to the present invention, as desired.

Figure 3:
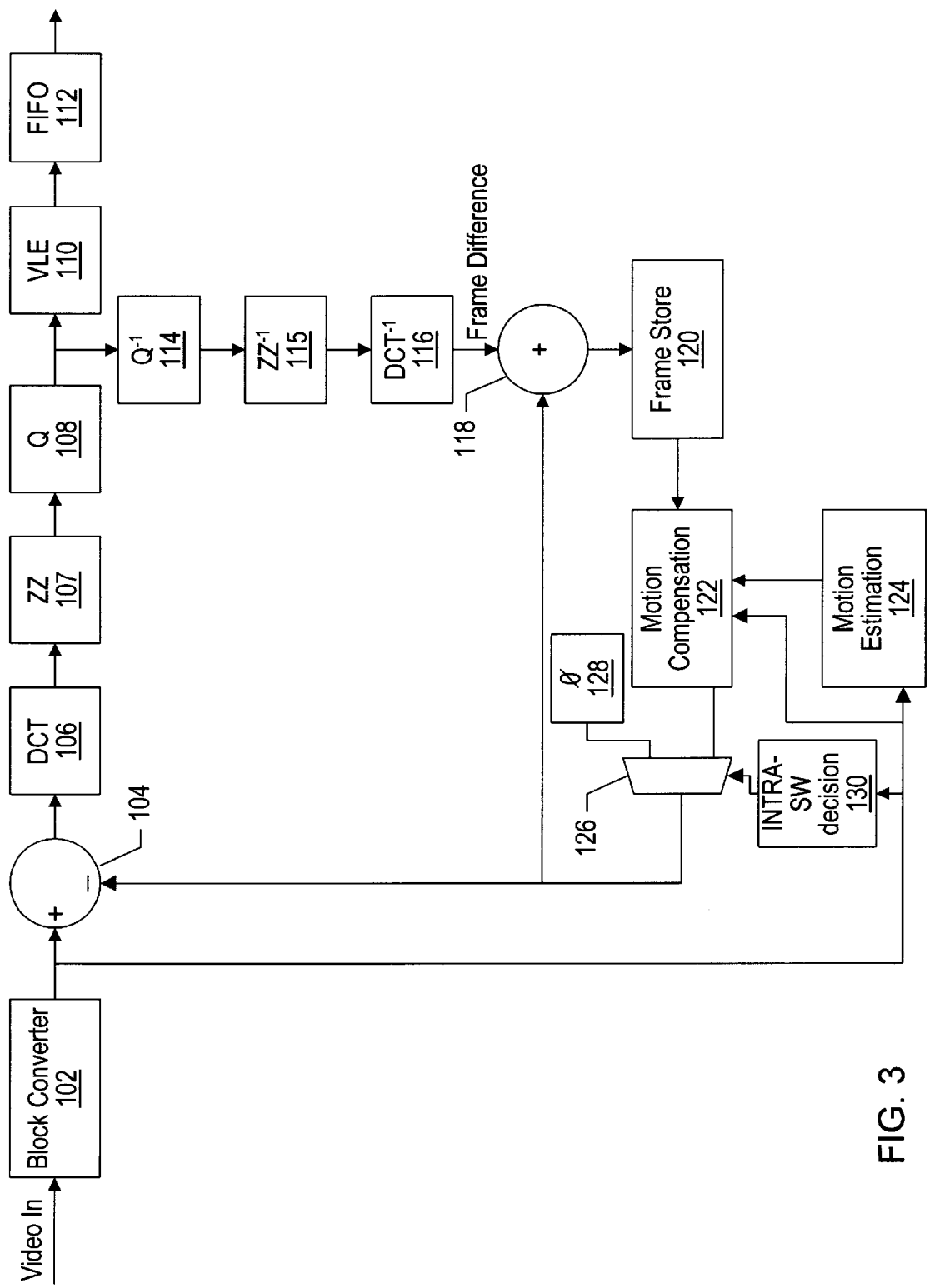
FIG. 3 is a block diagram illustrating the MPEG encoder of FIG. 1 including the multi port pixel processing array according to the present invention.

FIG. 3—MPEG Encoder Block Diagram

Referring now to FIG. 3, a block diagram illustrating the MPEG encoder of FIG. 1 is shown. As shown, the video encoder 76 receives an uncompressed digital video stream and outputs an encoded stream. The uncompressed digital video stream is a bitstream of video data which is used to present a video sequence, such as a television segment or movie, onto a screen, such as a television or a computer system. In the preferred embodiment, the video encoder 76 compresses the uncompressed digital video stream using the MPEG-2 compression algorithm. Other types of compression may be used, as desired. As shown, the video compression method uses motion estimation logic 124 according to the present invention, as discussed further below.

As shown in FIG. 3, a block converter 102 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 102 provides sequential pixel values to a subtractor 104 and to motion compensation logic 122 and motion estimation logic 124, described further below. The block converter 102 also provides an output to an Intra-SW decision block 130.

The subtractor 104 receives an input from a multiplexer 126 and operates to subtract the output of the multiplexer 126 from the output of the block converter 102. The multiplexer 126 receives inputs from the motion compensation logic 122 and also receives a 0 input from block 128. The multiplexer 126 receives a select input from the Intra-SW decision block 130. The Intra-SW decision block 130 determines whether an interfield or intrafield mode is being used. In the interfield data mode, the multiplexer 126 provides the output from the motion compensation block 122, and the subtractor 102 subtracts each block of a macroblock provided by motion compensation logic 122 from a corresponding block provided from the block converter 102. In the intrafield data mode, the multiplexer 126 provides an output from the zero block 128, and thus the blocks from the block converter 102 pass through the subtractor 104 unmodified.

The subtractor 104 provides output blocks of motion-predicted, differentially encoded macroblocks (intermode) or unmodified output blocks (intramode) to a DCT converter 106. The DCT converter 106 converts each of the blocks to DCT format, resulting in corresponding 8×8 blocks of DCT coefficients. The DCT format expresses the data in a form which simplifies subsequent processing, and thus transformation to DCT format is a first step for enabling compression of video data. For each DCT block, the first or top left coefficient typically comprises the direct current (DC) component of the block, and the remaining values are alternating current (AC) components for increasing vertical and horizontal frequencies.

The DCT coefficients from the DCT converter 106 are provided to a ZZ block 107 which scans the 8×8 block in a zig zag fashion. The output of the ZZ block 107 is provided to a quantizer 108, which translates each coefficient value into a binary value having an assigned number of bits. A larger number of bits are typically used for the lower-order coefficients than for the higher-order coefficients, since the human eye is less sensitive to image components at higher spatial frequencies than to components at lower spatial frequencies.

The data values from the quantizer 108 are provided to a variable length encoder (VLE) 10 for encoding the data for purposes of storage and/or transmission. The VLE 110 scans and converts the blocks of data to variable length codes (VLCs) according to the principles of entropy coding, where shorter codes are allocated to the more probable values to achieve coding gain and thus compression of the data. One such VLC coding scheme is referred to as the Huffman coding, although other coding schemes are contemplated. The VLCs are provided from the VLE 110 to a first-in first-out (FIFO) buffer 112.

For the interfield mode, the data values from the quantizer 108 are provided to an inverse quantizer 114 for reversing the operation performed by the quantizer 108 to produce approximate DCT coefficients representing each block of the encoded image. Since quantization is usually a lossy process, the output of the inverse quantizer 114 introduces noise and errors. Mismatch control may be applied to minimize the noise and errors, where the particular functions performed depend upon the particular type of encoder system being implemented, such as MPEG-1, MPEG-2, H.261, DC2, etc.

The output data of the inverse quantizer 114 is provided to an inverse ZZ block 115 which reverses the operation of the ZZ block 107. The output of the inverse ZZ block 115 is provided to an inverse DCT (IDCT) converter 116 for reversing the operation performed by the DCT converter 106. The frame difference blocks at the output of the IDCT converter 116 are provided to one input of a two-input adder 118. The adder 118 also receives the output data blocks from the motion compensation logic 122. The output pixel values from the adder 118 are provided to a frame store memory 120, where the stored data may be provided to a video buffer (not shown) and displayed on a display device (not shown), such as a monitor.

The values in the frame store memory 120 are provided to the input of the motion compensation logic 122. Motion estimation logic 124 provides an output to the motion compensation logic 122. In general, the motion estimation logic 124 compares the incoming frame from the block converter 102 with the reconstructed previous frame stored in the frame store memory 120 to measure motion in the form of motion vectors, where the motion vectors are provided to the motion compensation logic 122. The motion estimation logic 124 includes a multi port pixel processing array which has reduced pixel data loading latency according to the present invention.

The motion compensation logic 122 shifts objects to estimated positions in the new frame, resulting in a predicted frame. In the interfield mode, this predicted frame is then subtracted from the input frame to obtain a frame difference or prediction error. This process separates interframe redundancy and the prediction error, otherwise referred to as entropy. In the interfield mode, the frame difference is processed by the DCT converter 106 and the quantizer 108 to remove spatial redundancy.

Figure 4:
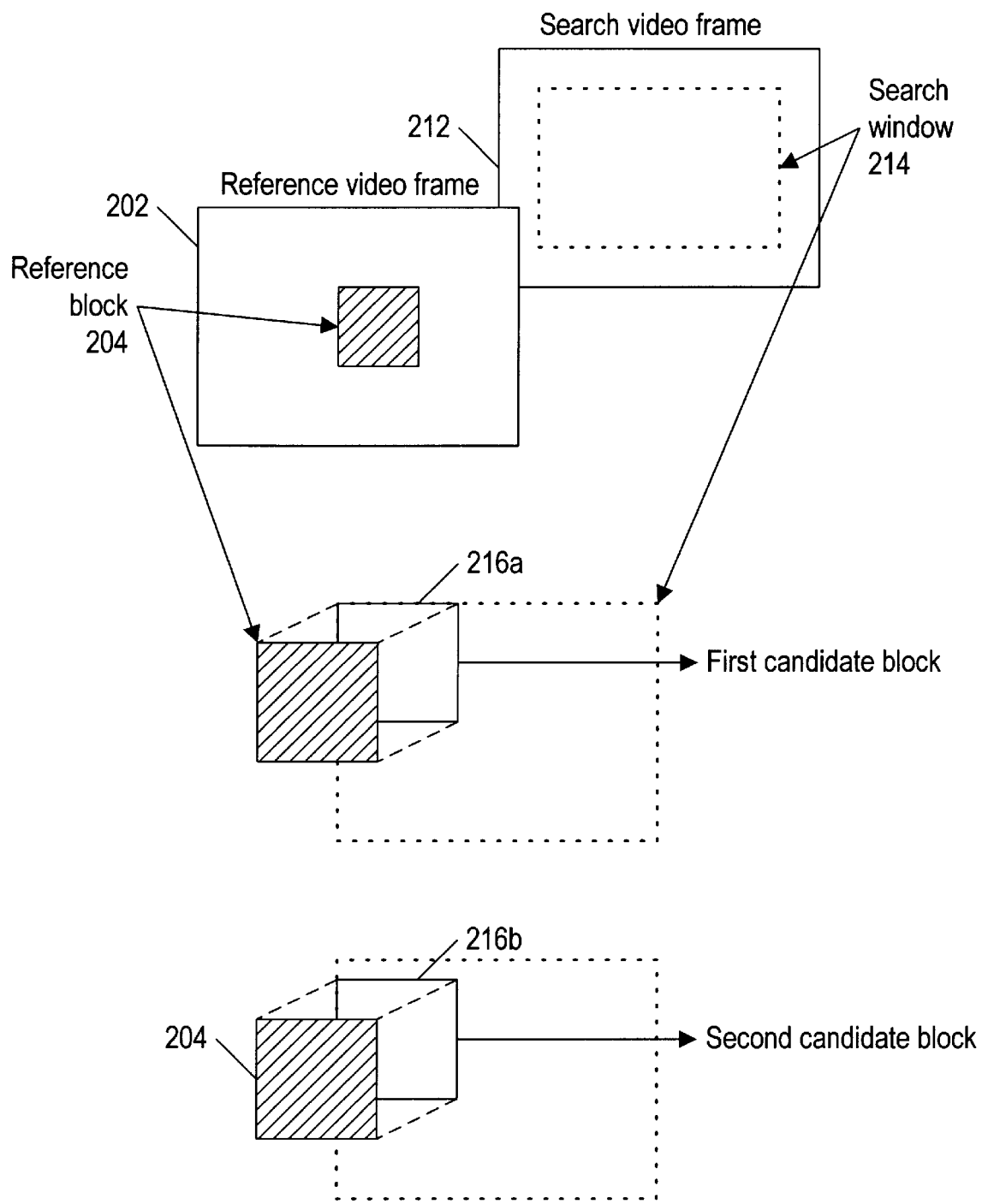
FIG. 4 illustrates operation of block matching motion estimation between a reference frame and a search frame, wherein a reference block in the reference frame is swept across various candidate blocks in a search window of the search frame.

FIG. 4—Block Matching Motion Estimation

As discussed above, most video compression algorithms use motion estimation to identify temporal redundancy between frames of the video sequence. The motion estimation computation computes motion estimation vectors between one or more blocks in a reference frame and a corresponding one or more blocks in a neighboring or subsequent frame in order to estimate the motion or change of the blocks between the reference frame and the neighboring or subsequent frame.

In general, block matching is the most popular motion estimation method and is used in the MPEG standard. FIG. 4 illustrates operation of the block matching motion estimation method. More particularly, FIG. 4 illustrates a reference video frame 202 and a search video frame 212. The reference video frame 202 is partitioned into equalized reference blocks, such as reference block 204. The subsequent frame or search video frame is partitioned into respective search windows or search areas for each of the reference blocks. Search window 214 corresponds to reference block 204. The center point or location of a respective search window 214 preferably corresponds to the center point or location of the reference block 204 in the reference frame 202. As shown, the search window 214 is larger than the reference block 204 and is preferably centered in location relative to the respective reference block 204.

The search window 214 is larger than the reference block 204 to allow the reference block 204 to be compared with multiple "candidate" blocks 216 in the search window 214. Thus, the search window 214 is partitioned into a plurality of candidate blocks 216 which have the same size as the reference block 204. Block matching compares a respective reference block 204 of a reference video frame 202 to a plurality of candidate blocks 216 in the search window 214 of a search video frame 212 in order to determine the closest match and hence compute the motion vector between the two blocks for the respective frames. Thus, block matching involves, for each reference block 204, searching for a similar block among the candidate blocks 216 in a search window or search area 214 located in the subsequent or neighboring frame, referred to as the search video frame 212.

In the block matching method, the search is performed by measuring the closeness between the reference block 204 and each candidate block 216 in the search window 214 of the respective search video frame 212, and then choosing the closest match. The measure of closeness between the reference block 204 and a candidate block 216 generally involves computing the Sum of Absolute Errors (SAE) between the two blocks, which is the sum of the absolute differences between every corresponding pixel in the two blocks. The smaller the SAE of the two blocks, the closer or better match there is between the two blocks.

As shown in FIG. 4, the reference block 204 is compared to different candidate blocks 216 in the search window 214 of the search video frame 212. FIG. 4 illustrates the reference block 204 and only two of the candidate blocks 216 of the search window 214. The reference block 204 is effectively moved across the search window 214 by displacements of one pixel at a time in the horizontal and the vertical directions. At each of these positions, the SAE between the reference block 204 and the candidate block 216 is computed. The candidate block 216 that results in the minimum SAE among all the SAE values is chosen as the match for the reference block 204.

Thus, for each reference block 204 in a reference frame 202, the task of motion estimation comprises an exhaustive computation of SAE's for each of the candidate blocks 216 in the respective search window 214 to achieve SAE values for each candidate block 216. After these SAE values have been computed, the method then chooses the candidate block 216 with the minimum SAE.

Multi Port Pixel Processing Array of the Preferred Embodiment

Figure 5:
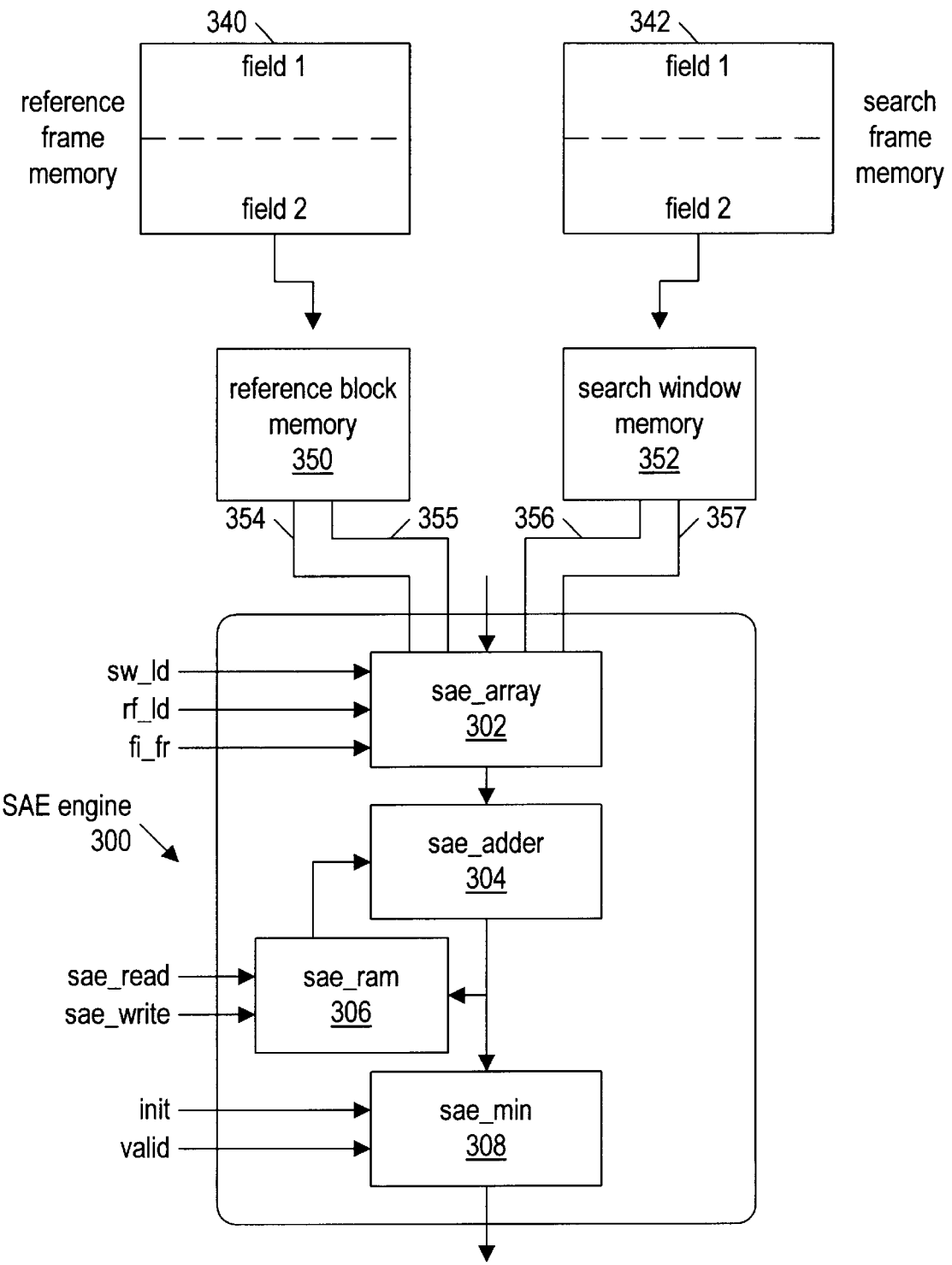
FIG. 5 illustrates a Sum of Absolute Errors (SAB) Engine including an SAE array according to the preferred embodiment of the present invention.

FIG. 5—Motion Estimation System

Referring now to FIG. 5, a motion estimation system which includes a multi port pixel processing memory array 302 according to the present invention is shown. In the preferred embodiment, the motion estimation system includes a reference frame memory 340 for storing a reference frame of video data and a search frame memory 342 for storing a search frame of video data.

It is noted that the reference frame pixel data and the search frame pixel data may be stored in a first mode where the video data for all of the scan lines is stored as the scan lines appear on the screen. Alternatively, the video may be stored in a second mode, wherein a first field in the memory corresponds to, for example, odd horizontal scan lines of the video frame, and a second field comprises even horizontal scan lines of the video frame. FIG. 5 illustrates both the reference frame memory 340 and the search frame memory 342 storing pixel data in the second mode, wherein the data comprises a first field storing pixel data for odd scan lines and a second field storing pixel data for even scan lines. It is noted that, when the pixel data is stored in the second mode, the motion estimation array 302 may operate in a frame mode to receive and compare pixel data output from each of the two or more fields simultaneously, thus receiving and comparing pixel data output for the entire frame. The motion estimation array 302 may also operate in a field mode to receive and compare pixel data output from only one of the fields.

The reference frame memory 340 is coupled to provide pixel data output to a reference block memory 350. The reference block memory 350 stores a particular reference block from the reference frame stored in reference frame memory 340. As discussed above, in video compression methods, such as MPEG, the reference frame is divided into respective reference blocks in order to perform motion estimation. Thus, the reference block memory 350 stores a respective reference block from the reference frame memory 340. Similarly, the search frame memory 342 is coupled to provide search window pixel data to search window memory 352. As shown, the search window memory 352 is larger than the reference block memory 350. The search window memory 352 stores search window pixel data, wherein the search window of video data comprises a plurality of candidate blocks which are to be compared with the reference block stored in the reference block memory 350 during the motion estimation process.

The reference block memory 350 includes two or more output ports, preferably two output ports. Likewise, the search window memory 352 comprises two or more, preferably two, output ports. The two output ports of the reference block memory 350 and the two output ports of the search window memory 352 are coupled to respective inputs of the SAE array 302 in the SAE engine 300. The SAE array 302 comprises the multi port pixel processing memory array 302 of the present invention. The SAE engine 300 calculates the Sum of Absolute Errors (SAE) between a block of pixels in a reference video frame and a plurality of candidate blocks of pixels in a search window of a search video frame. However, the multi port pixel processing memory array 302 according to the present invention may be comprised in other logic or used in other applications, as desired.

It is noted that the reference frame memory 340 and/or search frame memory 342 may be coupled directly to the SAE array 302 in the SAE engine 300. In other words, the reference block may be transferred directly from the reference frame memory 340 to the SAE array 302, and likewise the search window may be transferred directly from the search frame memory 342 to the SAE array 302, instead of storing the reference block and the search window in the intermediate storage elements 350 and 352. In this embodiment, the reference frame memory 340 and search frame memory 342 each include two output ports for coupling to the SAE array 302.

The SAE Engine 300 includes the multi port pixel processing memory array element 302, referred to as SAE array 302, an adder 304 referred to as SAE adder, a storage memory 306 referred to as SAE RAM, and minimum determination logic 308 referred to as SAE min. In the SAE engine 300 of FIG. 5, the two blocks, the reference block and the candidate block, are first loaded into the SAE array 302 of the Engine 300. The SAE array 302 computes the absolute difference between every pixel in the reference block and its corresponding pixel in the candidate block. The adder element 304 in the SAE engine 300 then adds or sums these absolute differences to form a Sum of Absolute Errors (SAE). The minimum logic SAE min 308 keeps track of the minimum SAE during the successive SAE calculations as needed for motion estimation.

The SAE array 302 receives input control signals referred to as sw_ld and rf_ld. The control signal sw_ld is a search window load signal which controls loading of memory elements in the SAE array 302 with the search window pixel data from the search window memory 352. Similarly, the rf_ld signal is a reference block memory load signal which controls loading of memory elements in the SAE array 302 with reference block pixel data from the reference block memory 350. The SAE array 302 also receives an input control signal referred to as fi_fr which controls addition of the SAE results within the SAE array 302. The SAE RAM 306 receives input control signals referred to as SAE read_ and SAE_write, which control reads and writes to the SAE RAM 306. The SAE min block receives input control signals referred to as init and valid. The init control signal controls the initialization of the SAE min logic 308. The valid control signal informs the minimum logic to examine its inputs and compare the inputs with a value currently stored.

The SAE array memory array 302 is designed to perform Sum of Absolute Error (SAE) computations between a reference block of pixels from the reference video frame and a candidate block of pixels from the search video frame at every clock cycle. As discussed above, the initial loading of the reference block and the respective candidate block in the SAE array 302 introduces a relatively large amount of latency in the motion estimation method. As shown in FIG. 5, the SAE array 302 includes dual port inputs for receiving pixel data from the reference block memory 350. Likewise, the SAE array 302 also includes two input ports for receiving pixel data over data channels 356 and 357 from the search window memory 352. This allows faster loading or initialization of the SAE array 302, thus providing improved performance in the SAE computations.

In the preferred embodiment, the SAE memory array 302 is designed based on block matching motion estimation requirements. In the preferred embodiment, the SAE memory array 302 is designed to compare 8×8 blocks of pixels. The SAE memory array 302 holds an 8×8 block of a reference video frame and an 8×8 block of a search video frame at any one time. The SAE memory array 302 is also scalable to larger or smaller blocks of pixels, including, but not limited to, 4×4 and 16×16 arrays. The adder 304 operates to add all of the partial SAEs output from the SAE memory array 302 to form the final SAE for the block.

Figure 6:
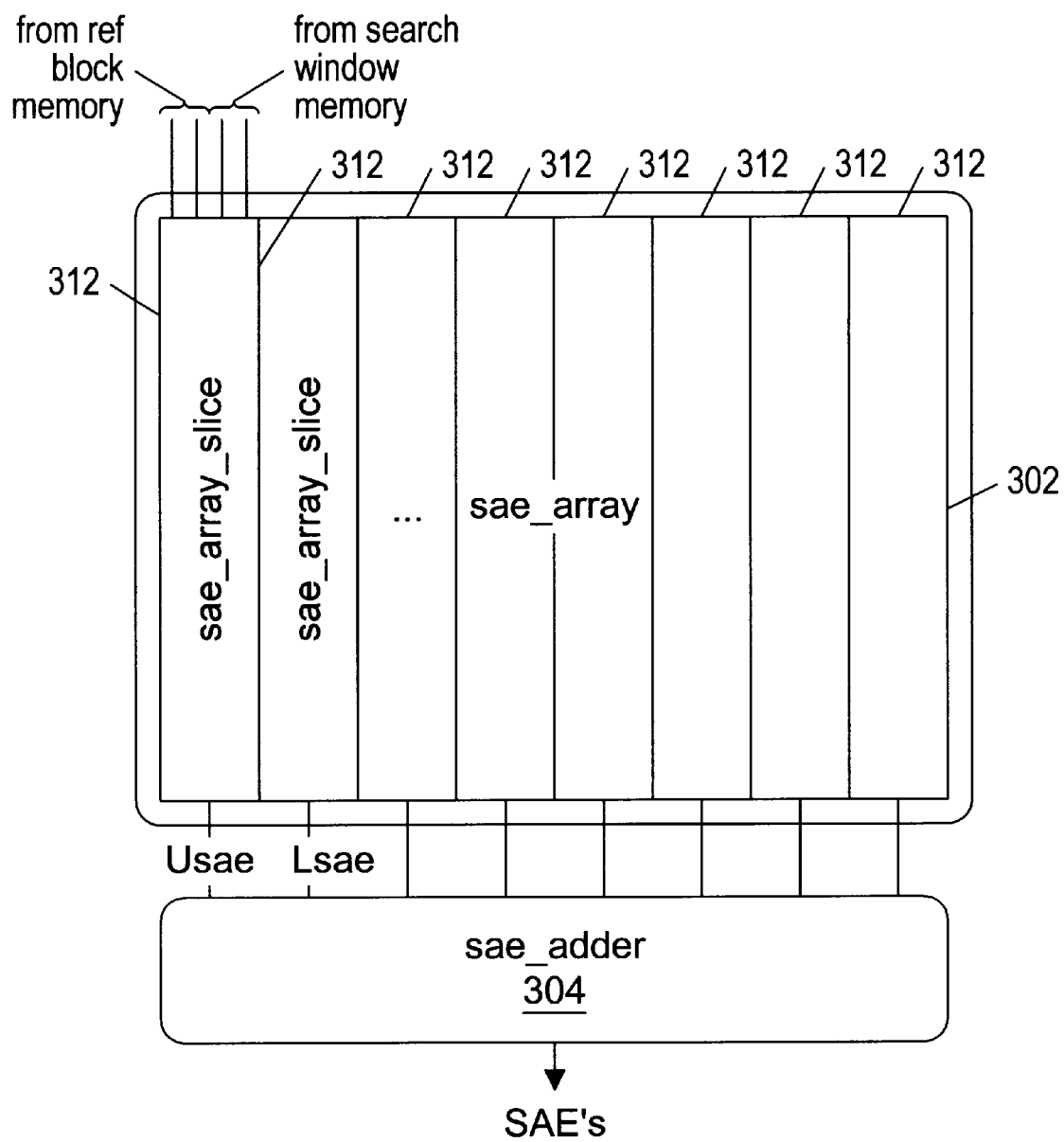
FIG. 6 illustrates the Sum of Absolute Errors (SAE) array of FIG. 5.
Figure 7:
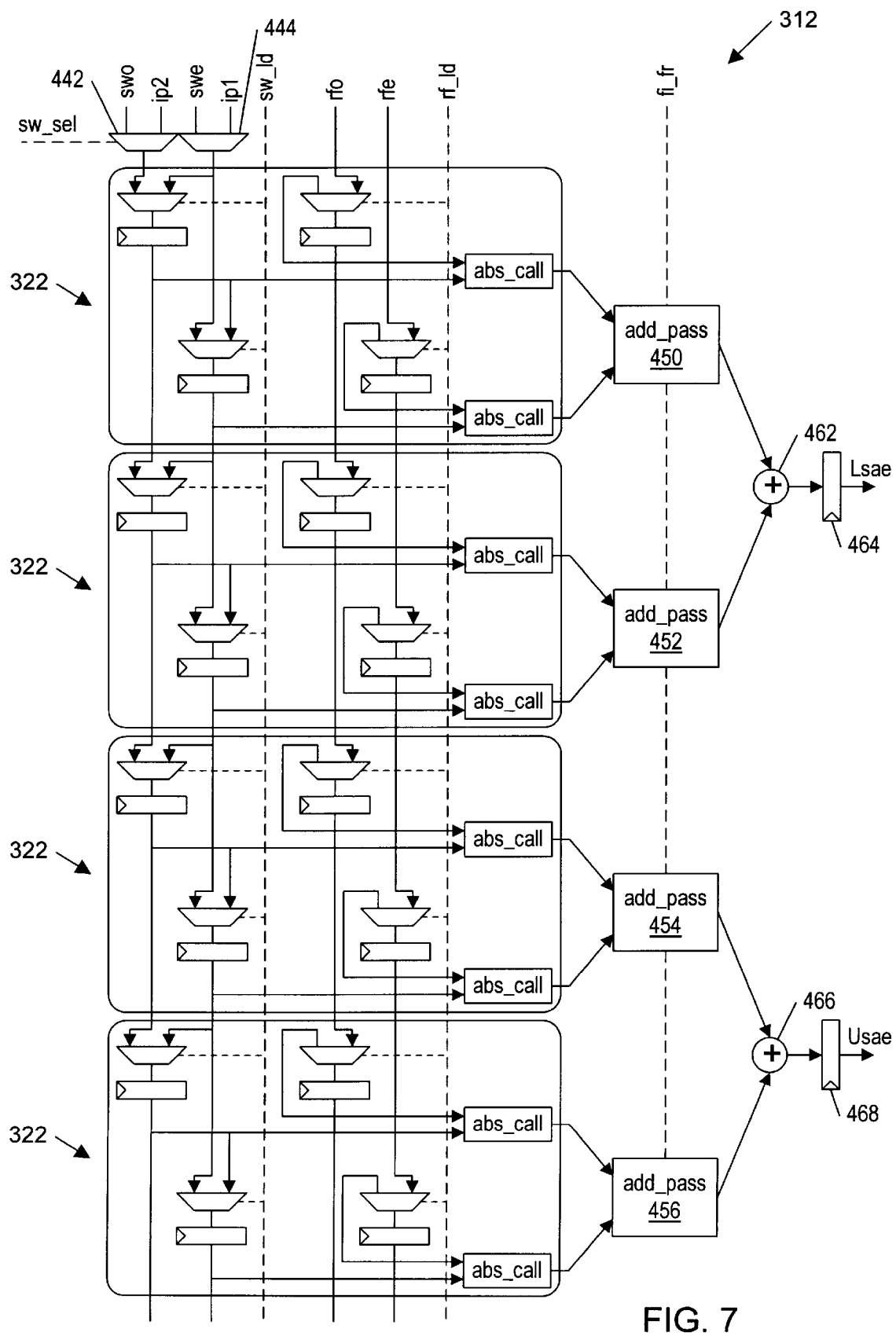
FIG. 7 illustrates a SAE slice from the SAE array of FIGS. 5 and 6.

Referring now to FIG. 6, a block diagram illustrating the SAE memory array 302 and the SAE adder 304 is shown. The SAE memory array 302 comprises 8 SAE slices 312. FIG. 7 is a more detailed diagram illustrating an SAE slice 312. As shown in FIG. 6, each SAE slice 312 receives two inputs from reference block memory 350 and search window memory 352. As shown in FIG. 7, each SAE slice 312 comprises 4 SAE cells 322.

Figure 8:
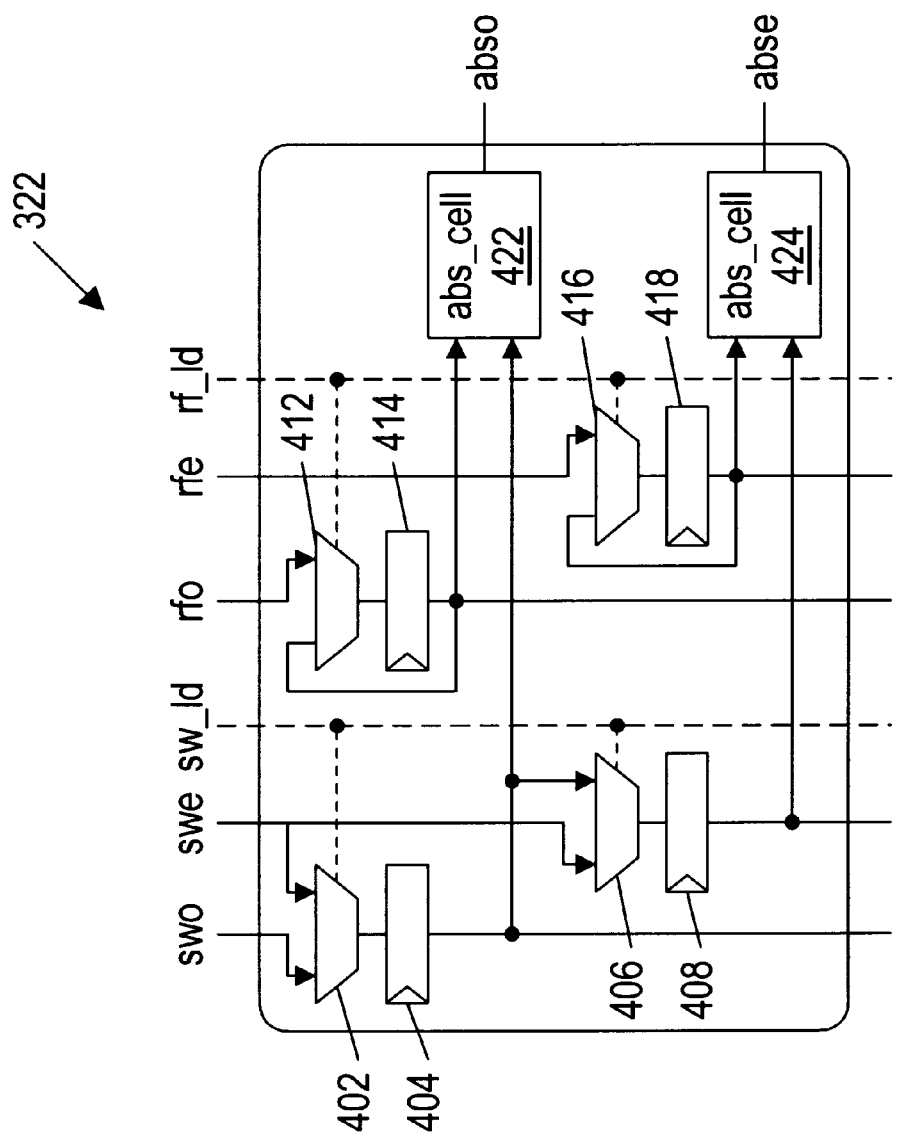
FIG. 8 illustrates a SAE cell from the SAE slice of FIG. 7.

Referring now to FIG. 8, an SAE cell 322 is shown. The SAE cell 322 is the most basic building block of the SAE array 302 and is designed to compute the absolute difference between two vertically adjacent pixels in the reference block and two vertically adjacent pixels in a candidate block of the search window. Each SAE cell 322 requires a total of four 8-bit registers, 2 for the reference block pixels and 2 for the search window pixels. Hence each SAE cell comprises 4 input pixel ports and 2 absolute difference modules per cell.

As shown, each SAE cell 322 receives pixel data from data lines referred to as swo, swe, rfo, and rfe. The incoming data lines swo, swe, rfo, and r fe are each 8 bits wide and carry pixel data from the memories 350 and 352 into the processing array. The data lines swo and swe are search window odd and search window even data lines provided from the search window memory 352 which transfer pixel data from the search window memory 352 into the SAE array 302. The swo (search window odd) data line transfers pixel data from odd horizontal scan lines in the search window, and the swe (search window even) data line transfers pixel data from even horizontal scan lines in the search window, respectively. Likewise, the rfo and rfe data lines are reference block odd and even memory data lines provided from the reference block memory 350. The rfo and rfe data lines transfer pixel data from the reference block memory 352 into the SAE array 302. The rfo and rfe data lines transfer pixel data from odd and even horizontal scan lines of the reference block, respectively.

Thus, if the video data is stored in the search frame memory 342 and/or search window memory 352 in the second mode, comprising a first field of odd horizontal scan lines and a second field of even horizontal scan lines, the data lines swo and swe carry the pixel data from the respective fields, i.e., the odd and even scan lines, respectively, into the respective cells 322 of the SAE array 302. Similarly, if the video data is stored in the reference frame memory 340 and/or reference block memory 350 in the second mode. the data lines rfo and rfe carry the pixel data from the respective fields into the respective cells 322 of the SAE array 302.

It is noted that the SAE array or motion estimation array 302 may operate in frame mode and receive pixel data output from each of the fields of data substantially simultaneously, or may operate in field mode and receive pixel data output from only one of the fields of data. Thus the present invention provides a single SAE array or motion estimation array 302 which operates both in field mode and in frame mode. This removes the requirement of separate engines for field and frame mode, which are required in prior art systems.

As shown in FIG. 8, the swo data line is connected to a first input of a two input multiplexer 402. The swe data line is connected to the other input of the multiplexer 402. The output of the multiplexer 402 is provided to an input of a memory element 404, preferably an 8-bit register for storing an 8-bit pixel data value. The swe data line is also provided to an input of another multiplexer 406. The other input of the multiplexer 406 receives the output of the register 404. The multiplexer 406 provides an output to a candidate block pixel memory element 408, wherein the candidate block pixel memory element 408 is preferably an 8-bit register for storing an 8-bit pixel value. The search window load signal sw_ld is connected to a select input of each of the multiplexers 402 and 406 and selects whether pixel values are loaded from a neighboring candidate block memory element within the cell or an adjacent cell, or from a candidate block memory element in a corresponding location in an adjacent cell. This is shown more clearly in FIG. 7 search window is loaded into the respective memory elements 404 and 408. The outputs of the candidate block pixel memory elements 404 and 408 are also coupled to provide data to an adjacent lower SAE cell 322 in the SAE slice 312 presuming that the cell 322 is not the last cell in the slice 312.

The rfo data line is connected to an input of a two input multiplexer 412. The output of the multiplexer 412 is coupled to a reference block pixel memory element 414, preferably an 8-bit register for storing an 8-bit pixel value. The output of the reference block pixel memory element 414 is connected back to the second input of the multiplexer 412. The rfe data line is connected to an 8-bit input of multiplexer 416. The output of the multiplexer 416 is connected to a reference block pixel memory element 418, preferably an 8-bit register for storing an 8-bit pixel value. The output of the reference block memory element 418 is connected back to the other input of the multiplexer 416. The outputs of the memory elements 414 and 418 are also coupled to provide data to an adjacent lower SAE cell 322 in the SAE slice 312, presuming that the cell 322 is not the last cell in the slice 312.

The outputs of the two memory elements 404 and 414 are connected to an absolute cell block 422. The absolute cell block 422 performs an absolute difference comparison between the reference block pixel value stored in the memory element 414 and the candidate block pixel stored in the memory element 404. The absolute cell 422 provides an output value referred to as abso, which is the absolute difference output of the reference block and candidate block pixels for an odd horizontal scan line. Likewise, the memory elements 408 and 418 provide outputs to a second absolute different cell 424. The absolute different cell 424 receives a reference block pixel data value from the memory element 418 and receives a candidate block pixel data value from the memory element 408 and computes the absolute difference between the two pixel values. The absolute different cell 424 produces an output referred to as abse, which is the absolute different value between the reference block pixel and candidate block pixel for respective even horizontal scan lines of the reference block and candidate block.

Therefore, each SAE cell 322 receives odd and even data line inputs from the search window memory 352 and from the reference block memory :350, which is stored in respective memory elements 404, 408, 414 and 418, respectively. The control signals sw_ld and rf_ld shown with dashed lines in FIG. 8 control the loading of the memory elements.

Each of the candidate block pixel memory elements or registers can be controlled to load either a pixel from its neighboring register within the cell (or the cell above it), or from the register in the corresponding location in the upper adjacent cell. As discussed further below, a candidate block pixel memory element is loaded with a pixel from a neighboring register during SAE computation cycles, and is loaded from the register in the corresponding location in the upper adjacent cell during initialization or initial loading. Initialization or initial loading occurs when a new candidate block of data is loaded at the beginning of the search or at a new respective column in the search window. Each of the reference block pixel memory elements or registers is controlled to load either a pixel from itself or from the register in the corresponding location in the upper adjacent cell. The reference block register is reloaded with its current value during SAE computations because the reference block stays constant during SAE computations for the particular reference block. The reference block is loaded with a pixel value from the corresponding register in the adjacent cell above it during initialization or loading of the reference block into the SAE array 302.

Referring again to FIG. 7, as mentioned above an SAE slice 312 comprises four SAE cells 322 together which collectively form an SAE slice. Thus an SAE slice is formed by abutting 4 SAE cells together with additional logic, including 4 special adders, 2 registers, and 2 multiplexers, as shown in FIG. 7. As shown above, the SAE cell 322 is the most basic building block of the SAE array 302. The SAE cell 322 is designed to compute the absolute difference between each candidate block pixel storage element and the counterpart reference block pixel storage element. During operation, the two reference storage elements are loaded with two vertically adjacent pixels in the reference block and the two candidate storage elements are loaded with two vertically adjacent pixels in the candidate block.

As shown in FIG. 7, the SAE slice 312 includes two multiplexers 442 and 442 connected at the inputs of the uppermost or first SAE cell 322. The multiplexer 442 receives inputs from the swo output of the search window memory 352 and also receives an input referred to as ip2 from a half-pel interpolator engine (not shown). Similarly, the multiplexer 444 receives an input from the SWE output of the search window memory 352, as well as an ip1 output from the half-pel interpolator engine. The multiplexers 442 and 444 select between the raw output video pixels received from the search window memory 352 or half-pel interpolated pixels, referred as ip1 and ip2 received from the half-pel interpolator engine. The output of the multiplexer 442 is provided to one input of the multiplexer in the first sae cell 322. The output of the multiplexer 444 is provided to the other input of the multiplexer in the first sae cell 322. The output of the multiplexer 444 is also provided to an input of the second candidate block multiplexer in the first sae cell 322.

As shown in FIG. 7, each of the sae cells 322 provide two outputs from respective absolute different cells 422 and 424. As discovered above, these outputs represent the absolute difference between the pixel in the reference block and the corresponding pixel in the candidate block. These two outputs from each of the cells 322 are provided to respective $add_{pass}$ modules 450, 452, 454 and 456.

The add_pass modules are 450–456 designed to either output the sum of its two inputs or just pass one of the inputs through, depending on the status of the fi_fr control signal. The add_pass modules 450–456 output the sum of their two inputs during SAE computations when both sets of memory elements in the cell 322 are loaded with pixel data. The outputs of the add_pass modules 450–452 are provided to an adder 462, which sums the outputs of the add_pass modules 450 and 452. The adder 462 provides the sum to a register 464, which then provides an output referred to as Lsae or lower sum of absolute error. Similarly, the add_pass modules 454 and 456 provide their outputs to a adder 466. The adder 466 sums the outputs from the two add_pass modules 454 and 456 and provides this output to a register 468. The output of the register 468 is referred to as the upper SAE value or USAE. Thus, the outputs of the slice 312 are Lsae (Lower SAE) and Usae (Upper SAE), where lower and upper respectively refer to the lower half and the upper half of the reference block.

As shown in FIG. 7, and as discussed above, each of the memory elements in the SAE slice 312 are separately loadable in a dual ported fashion to allow faster loading and reduced initialization latency according to the present invention. As shown in FIG. 7 and 8, during initialization each of the memory elements 404 and 408 are loaded in parallel from either a memory element in an upper adjacent cell, or directly from the search window memory 352 if the respective cell is the uppermost cell in the SAE slice 312. Similarly, the memory elements 414 and 418 are loaded in parallel in a dual ported fashion. Thus, the motion estimation system method of the present invention has reduced loading latency as compared to prior art methods.

Thus, where the data is stored in the second mode comprising two or more fields, and the SAE array 302 is operating in frame mode where a full frame of video data is being compared, i.e., pixel data from both odd and even horizontal scan lines is being compared, the SAE computation can be performed on the frame of N scan lines with only N/2 clock cycles latency for loading the working memories. After loading, one new valid SAE output is generated per clock cycle thereafter, typically for 16 consecutive comparisons. The reduced loading latency is due to dual port parallel loading into the array.

When the SAE engine 302 is operating in field mode where only one field of data is being used in the comparison, then SAE computation can be performed on the one field of N scan lines with N clock cycles latency for loading the working memories. In this mode, half of the array may be disabled, which allows SAE computations for 8×4 blocks of reference and candidate data instead of 8×8 blocks of reference and candidate data.

As discussed further below, the SAE array 302 can be viewed as two register arrays, these being the reference block register array and the search window register array. Each of these arrays has a maximum capacity of 8×8 pixels. In prior art methods, 8 pixels were loaded per clock cycle, which required 8 cycles for an 8×8 block. In the SAE array 302 of the present invention, each of the reference block register array and search window register array can be broken into two 8×4 arrays for the purpose of parallel loading, requiring only 4 cycles for loading an 8×8 block. Thus, the present invention allows for rapid initialization of the search window and reference block memory arrays in conjunction with the ability to perform both field and frame based SAE computation.

FIGS. 9–11

Referring now to FIG. 9, as described above the SAE memory array 302 comprises 8 processing slices or SAE slices 312, with each slice comprising 4 processing cells referred to as SAE cells 322. FIG. 9 is a block diagram of the SAE array 302 and its components, wherein the white blocks represent candidate block pixel storage elements (404 and 408) and the shaded blocks represent reference block pixel storage elements (414 and 418). FIG. 10 illustrates the possible paths of data flow through an SAE slice, wherein the arrows in FIG. 10 indicate all the possible directions of the data flow in the array. FIG. 11 illustrates the possible directions of the data flow through an SAE cell 322.

Figure 12:
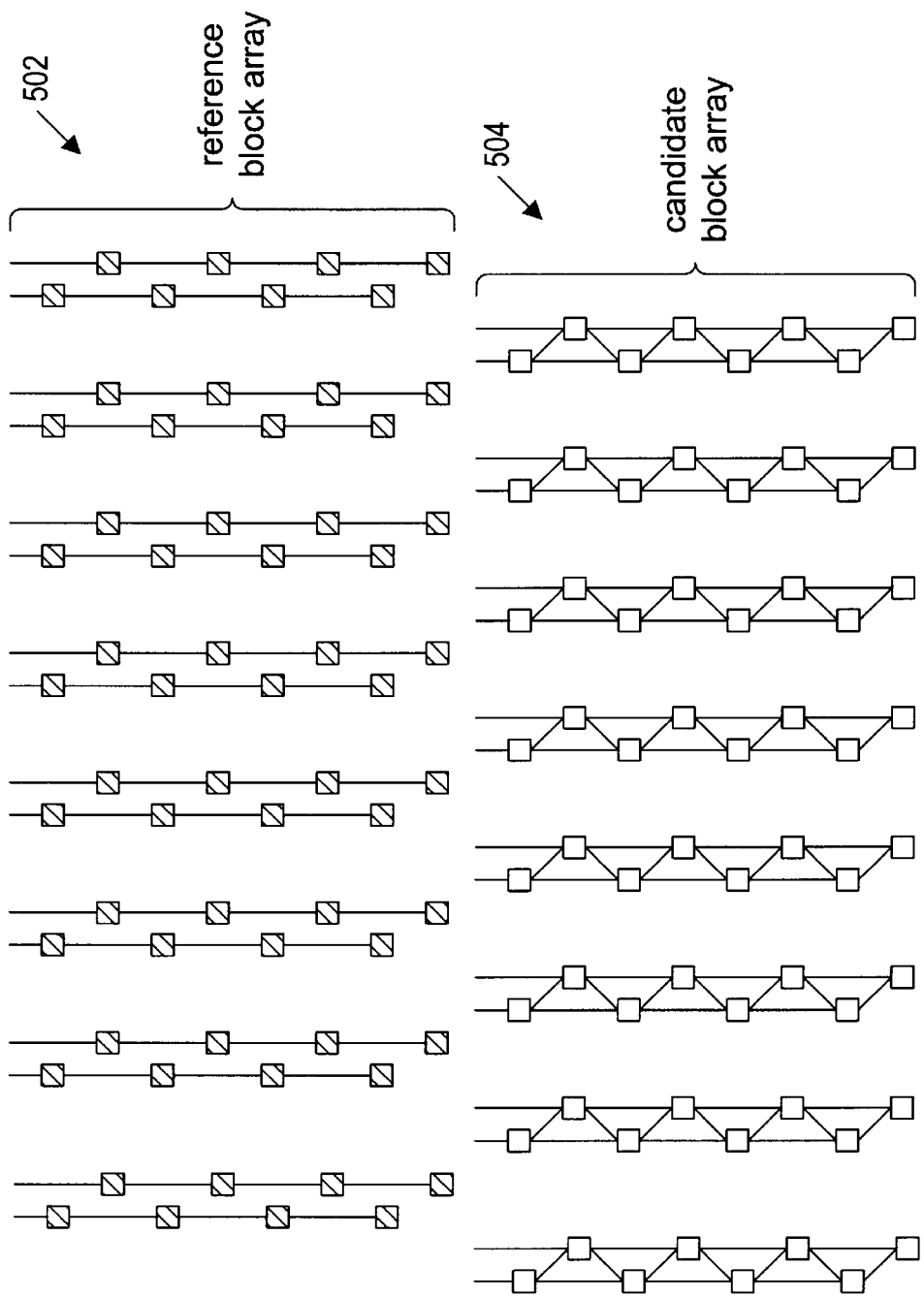
FIG. 12 is a block diagram illustrating the SAE array separated as two separate arrays comprising a reference block array and a candidate block array.

Referring now to FIG. 12, to better understand the loading and operation of the SAE memory array 302, the array 302 can be considered as two separate memory arrays, these being the reference block memory array 502 and the candidate block memory array 504. The reference block memory array 502 and the candidate block memory array 504, as well as additional logic, collectively form the SAE array 302. Each array has a dimension of 8×8 or a maximum capacity of 64 pixels. The absolute difference modules 422 and 424 (FIG. 8) interconnect the two arrays 502 and 504 and are located between each candidate block register and its corresponding reference block register, as shown in FIGS. 7 and 8.

Figure 13:
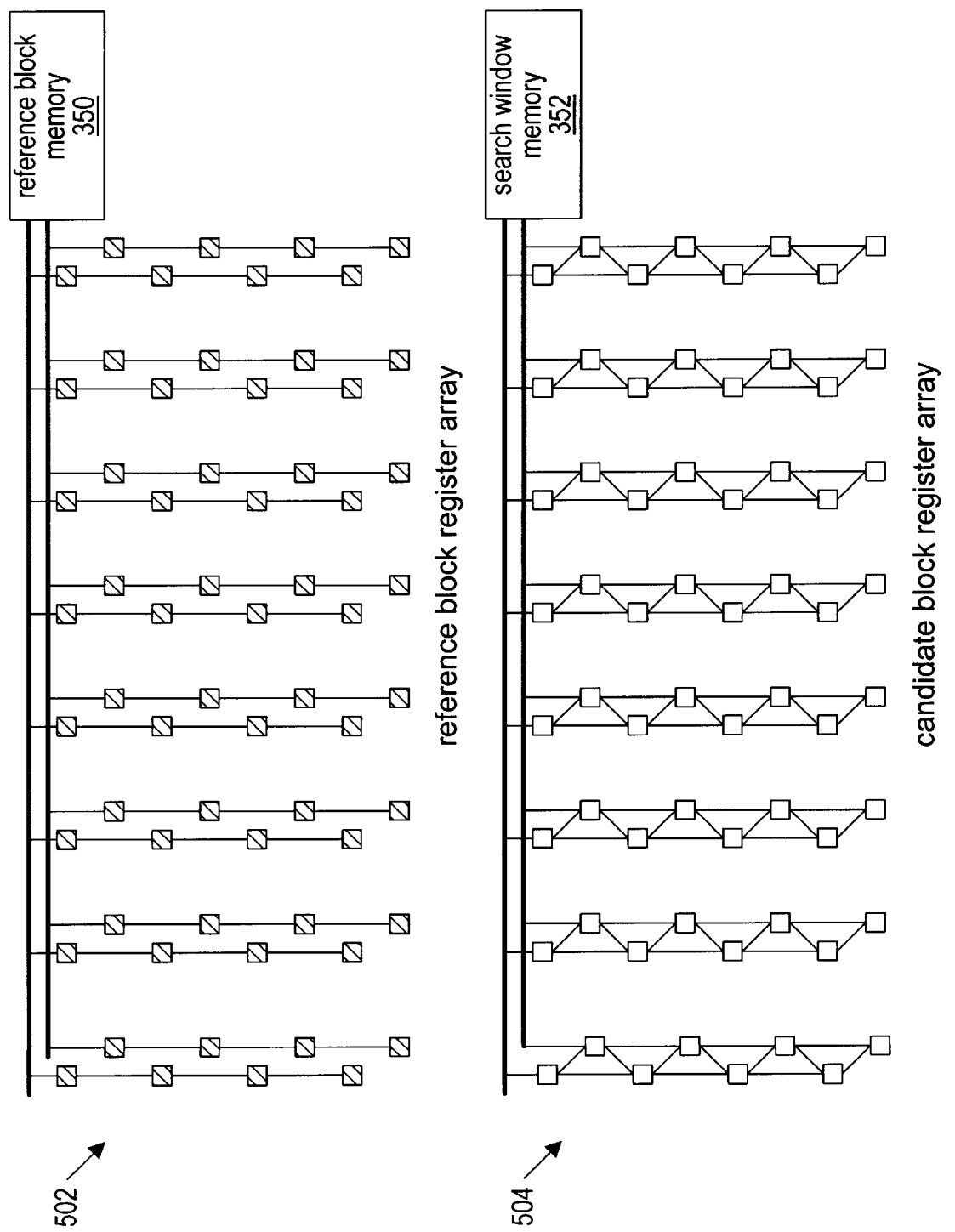
FIG. 13 illustrates the dual port interface between the reference block memory and the reference block array, and the dual port interface between the search window memory and the candidate block array.

FIG. 13 more clearly illustrates the dual ported nature of the SAE memory array 302 of the present invention. As shown, the two ports of the reference block register or memory array 502 are connected to outputs of the reference block memory 350. Likewise, the two ports of the candidate block register array 504 are connected to outputs of the search window memory 352. Thus, each of the reference block memory array 502 and the candidate block memory array 504 can be considered as two 8×4 arrays, with each 8×4 array connected to one port of the memories as shown in FIG. 13. This allows loading of the arrays with increased speed and thus reduced latency as compared to prior art designs.

FIG. 14—SAE Computation Operation

Figure 14A:
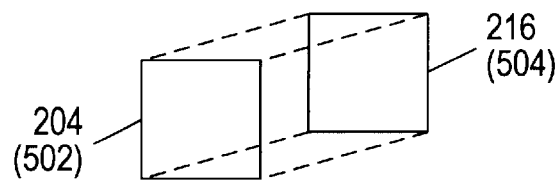
FIGS. 14A and 14B illustrates operation of the SAE array performing SAE computations for the first two columns of the search window.
Figure 14B:
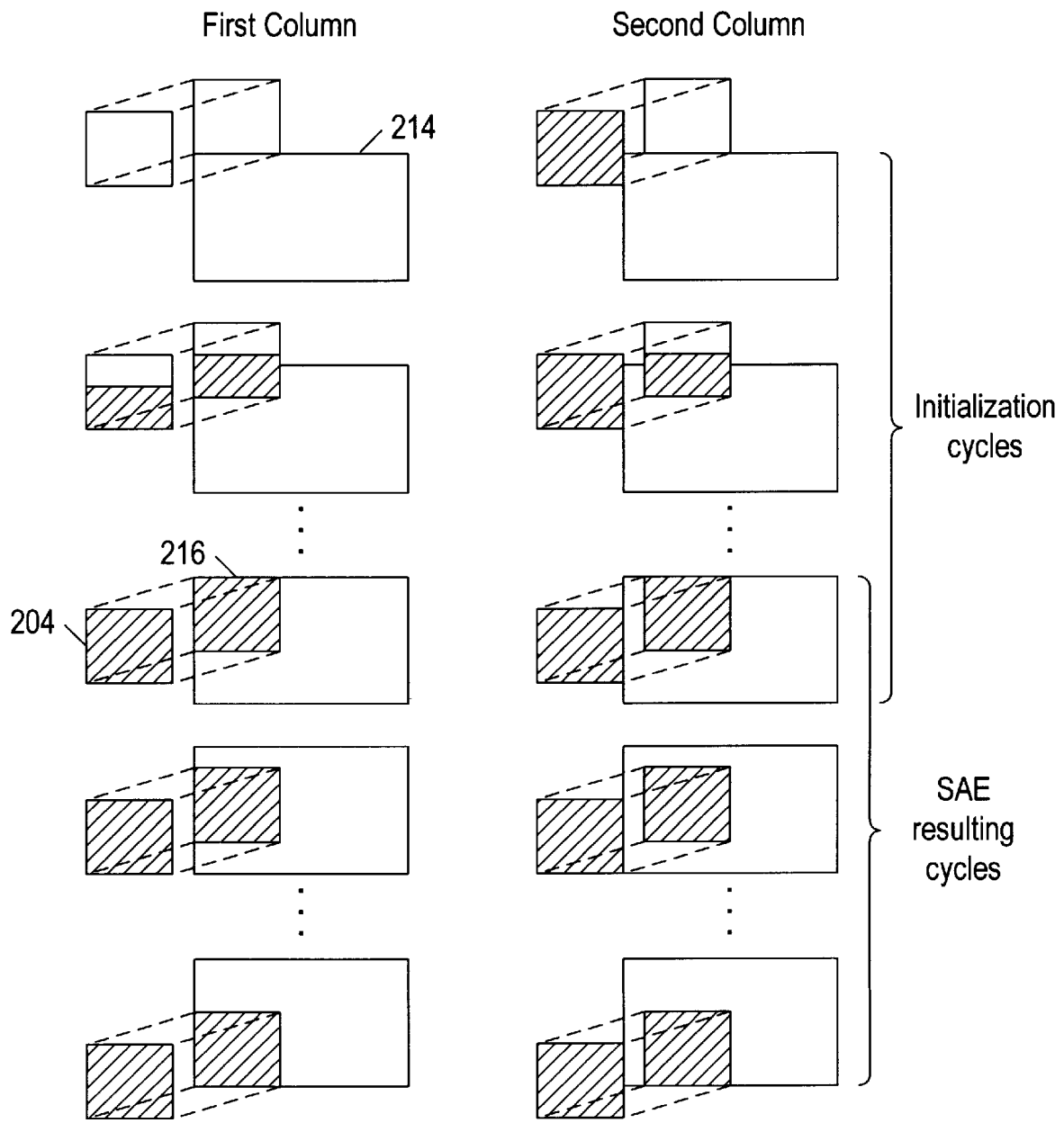

Referring now to FIGS. 14A and 14B, diagram illustrating operation of the block matching motion estimation technique is shown. FIGS. 14A and 14b is a symbolic diagram of the SAE array 302, with the two squares representing the reference block register array 502 and the candidate block register array 504. The two squares in FIG. 14A also represent the reference block pixel data 204 and the candidate block pixel data 216, as discussed above with reference to FIG. 4. FIG. 14B illustrates the initialization and SAE comparison cycles which are performed by the SAE array 302. FIG. 14B illustrates the operation of the processing array 302 performing SAE computations for only the first two columns of the search window.

In order to use the SAE array 302 to perform motion estimation, the two blocks being compared, namely, the reference block 204 and the first candidate block 216 from a column of the search window, are first loaded into the memory array 302. This initial loading occurs during the initialization cycles shown in FIG. 14B. During this initial loading, no SAE computations are performed. For the first column of the search window, SAE computations cannot be performed until both the reference block array 502 and the candidate block array 504 are both fully loaded with pixel data. For subsequent columns in the search window, SAE computations cannot be performed until the candidate block array is fully loaded with pixel data for the first candidate block of the new column.

After this initial loading, i.e., after the candidate block 216 for a respective column of the search window is fully loaded into candidate block array 504, the SAE computations are performed. In performing the SAE computations, the reference block remains fixed while the candidate block 216 is updated every cycle for a respective column, as described above. The candidate block 216 is updated every cycle for the respective column by shifting the block down one row in the candidate block array 504, and filling the newly vacant row of the array 504 with new pixel data from a scan line of the search window memory. Hence, every cycle a new candidate block 216 is effectively loaded by simply shifting the existing data down and loading in a new scan line from the search window memory. This results in a new SAE for each candidate block until a whole column of the search window is fully swept.

After each of the candidate blocks 216 in a column of the search window have been compared with the reference block 204, a candidate block 216 from a new column of the search window is loaded. Each of the candidate blocks 216 in the new column of the search window are then compared with the reference block 204 as described above. This operation repeats until all of the candidate blocks 216 in the search window have been compared with the reference block 204.

As shown in FIG. 14B, the initialization cycles which occur at the beginning of every column introduce a large amount of undesired latency in the SAE computation. In other words, during the loading of a new candidate block 216 at the top of each column, latency occurs as each line of the candidate block is loaded into the candidate block array 504. Once a candidate block 216 is loaded into the candidate block array 504 for a respective column, the SAE computations for the column require only one clock cycle per candidate block. Thus the initialization or loading of the candidate block 216 at each column of the search window introduces a relatively large amount of latency in the motion estimation process.

The multi port pixel processing array 302 reduces the clock latency introduced by the initial loading to half the cycles required in the prior art. In prior art methods, 8 pixels were loaded per clock cycle, which required up to 8 cycles for an 8×8 block to be loaded. In the new dual ported array, however, each of the reference block register array 502 and the candidate block register array 504 are effectively divided into two 8×4 arrays, allowing parallel loading. Thus, each of the reference block register array and the candidate block register array are loaded in 4 cycles.

Figure 15:
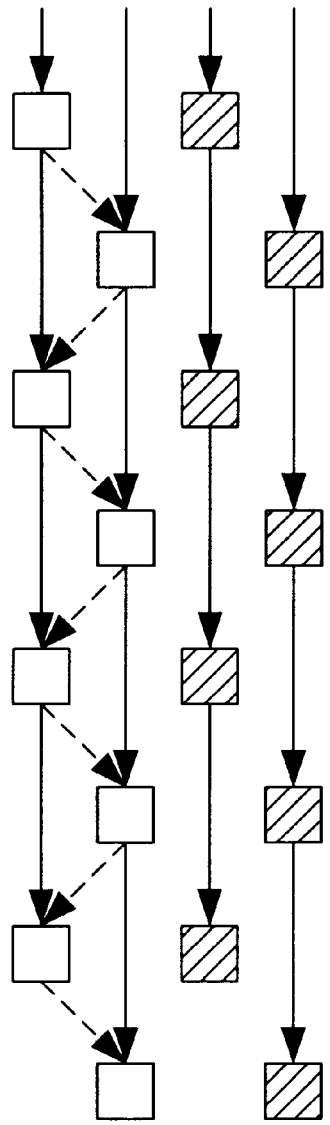
FIG. 15 illustrates data flow through the SAE slice during initialization.
Figure 16:
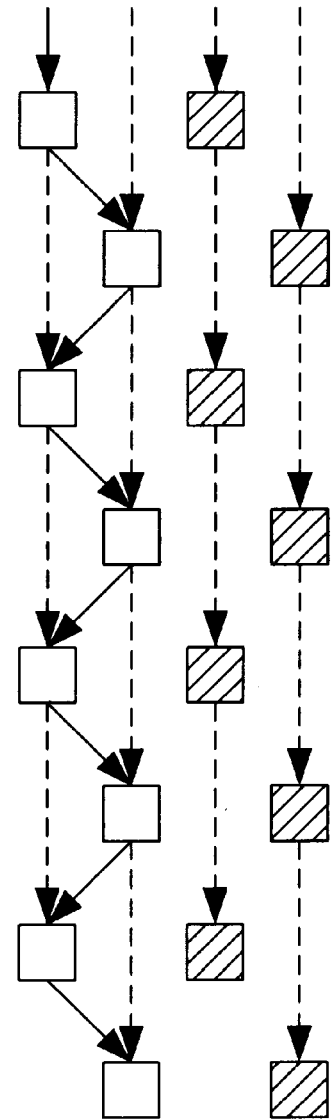
FIG. 16 illustrates data flow through the SAE slice during SAE computation cycles.

The operation of the multi port pixel processing array 302 is illustrated in FIGS. 15 and 16 by the flow of data through an SAE slice 312. As with FIGS. 9–11, in FIGS.15 and 16 the white blocks represent candidate block memory elements, and the shadow blocks represent reference block memory elements. In FIGS.15 and 16 the highlighted arrows indicate data flow through the slice 312, and the "grayed out" arrows indicate disabled data paths. FIG.15 illustrates flow of data through an SAE slice during initialization cycles where the SAE slice 312 is being loaded with data.

FIG. 16 illustrates flow of data through an SAE slice 312 during SAE computation cycles, where the SAE slice 312 is performing SAE computations between the reference block and a candidate block.

As shown in FIG. 15, the zig-zag path in the candidate block register array 504 is disabled during initialization. In effect, this breaks the array into two 8×4 arrays, with each one connected to an independent port of the memory. This allows parallel loading of the two 8×4 arrays. This parallel loading reduces the latency during loading or initialization, thus allowing increased performance of the motion estimation system.

As shown in FIG. 16, during the actual SAE computation cycles the zig-zag path is enabled while all other paths in the array are disabled. Thus the reference block remains stationary, i.e., the same reference block pixel data remains in the reference block memory array 504 during the SAE computation. Meanwhile, i:he candidate block is updated every cycle in the 8×8 candidate block array 504 for an extra column of the search window.

Conclusion

Therefore, the present invention comprises a system and method for generating motion estimation vectors from an uncompressed digital video stream. The present invention comprises a multi port pixel processing memory array which reduces the loading latency and thus provides improved performance.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

we claim:

1. A system for performing motion estimation between a reference video frame and a search video frame, comprising:
   a first memory for storing a reference block comprised in the reference video frame, wherein the reference block comprises a plurality of reference block pixels;
   a second memory for storing a search window comprised in the search video frame, wherein the search window comprises a plurality of search window pixels, wherein the second memory includes one or more output ports for providing portions of said search window pixels;
   a motion estimation array coupled to the first memory and the second memory for estimating at least one motion vector between the reference video frame and the search video frame, wherein the motion estimation array includes a reference block memory array portion for storing the reference block pixels and a candidate block memory array portion for storing a plurality of candidate block pixels from the search window, wherein the candidate block pixels comprise a subset of the search window pixels, wherein the candidate block memory array portion includes one or more input ports coupled to the one or more output ports of the second memory;
   wherein the motion estimation array comprises a plurality of hardware modules which perform block matching computations, wherein each of said hardware modules comprises a plurality of cells which perform comparisons between said reference block pixels and said candidate window pixels, wherein each of said cells comprises a plurality of reference block memory elements for storing said reference block pixels, and wherein each of said cells comprises a plurality of candidate block memory elements for storing said candidate block pixels;
   wherein lines of said candidate block pixels propagate through said candidate block memory elements in a pipeline fashion;
   wherein said hardware modules are configured to compare said plurality of reference block pixels stored in said reference block memory array portion with said candidate block pixels stored in said candidate block memory array portion in a single clock cycle.

2. The system of claim 1, wherein the candidate block memory array portion includes a plurality of input ports coupled to the output ports of the second memory, wherein each of said candidate block memory elements in said cells are loaded in parallel during initialization for reduced loading latency.

3. The system of claim 1,
   wherein each of the candidate block memory elements in at least a subset of cells is controllable to load one of said candidate block pixels from a neighboring candidate block memory element, or to load one of said candidate block pixels from the candidate block memory element in a corresponding location of an adjacent cell;
   wherein each of said candidate block memory elements in said at least a subset of cells operates to load one of said candidate block pixels from the candidate block memory element in the corresponding location of the adjacent cell during said initialization cycles; and
   wherein each of said candidate block memory elements in said at least a subset of cells operates to load one of said candidate block pixels from the neighboring candidate block memory element during said computation cycles.

4. The system of claim 3,
   wherein each of said hardware modules further comprises a plurality of multiplexers corresponding to said candidate block memory elements in each of said cells, wherein said multiplexers each include an output coupled to an input of a respective one of said candidate block memory elements, wherein at least a subset of said multiplexers in said at least a subset of cells each receives a first input from the neighboring candidate block memory element, and receives a second input from the candidate block memory element in the corresponding location in one of said adjacent cells.

5. The system of claim 4,
   wherein each of said reference block memory elements in said cells are loaded in parallel during initialization for reduced loading latency.

6. The system of claim 5,
   wherein each of the reference block memory elements in at least a second subset of cells is controllable to maintain its reference block pixel, or to load the reference block pixel from the reference block memory element in the corresponding location of the adjacent cell;
   wherein each of the reference block memory elements in said at least a second subset of cells operates to load the reference block pixel from the reference block memory element in the corresponding location of the adjacent cell during the initialization cycles.

7. The system of claim 1,
   wherein the second memory includes a first portion storing a first field of the search window pixels, and wherein the second memory includes a second portion storing a second field of the search window pixels; and wherein said second memory includes a first port coupled to said first portion for outputting search window pixels from said first field, and wherein said second memory includes a second port coupled to said second portion for outputting the search window pixels from said second field.

8. The system of claim 7,
wherein said motion estimation array is operable in a frame mode for receiving the search window pixels from said first field and said second field, and comparing the search window pixels from said first field and said second field with the reference block pixels; and
wherein said motion estimation array is operable in a field mode for receiving the search window pixels from only one of either of said first field or said second field and comparing the search window pixels from only one of either of said first field or said second field with the reference block pixels.

9. The system of claim 7,
wherein said second memory transfers the candidate block pixels from said first portion of said second memory to a first plurality of said candidate block memory elements, and wherein said second memory transfers the candidate block pixels from said second portion of said second memory to a second plurality of said candidate block memory elements, wherein said second memory transfers the candidate block pixels from said first portion to said first plurality of candidate block memory elements and transfers the candidate block pixels from said second portion to said second plurality of candidate block memory elements simultaneously during one or more of said initialization cycles.

10. The system of claim 7,
wherein said first field comprises the search window pixels from a first plurality of horizontal scan lines, and wherein the second field comprises the search window pixels from a second plurality of horizontal scan lines; and
wherein said first port is coupled to said first portion for outputting the search window pixels from said first plurality of horizontal scan lines, and wherein said second port is coupled to said second portion for outputting the search window pixels from said second plurality of horizontal scan lines.

11. The system of claim 1,
wherein the motion estimation array further comprises difference logic coupled to each of the reference block memory array portion and the candidate block memory array portion which computes differences between the reference block pixels and the candidate block pixels.

12. The system of claim 1, further comprising:
a plurality of data channels coupled between the output ports of the second memory and said input ports of the candidate block memory array portion;
wherein the data channels transfer the search window pixels from the second memory to the candidate block memory array portion with reduced loading latency.

13. The system of claim 1,
wherein the first memory includes a plurality of output ports for providing said reference block pixels;
wherein the reference block memory array portion includes a plurality of input ports coupled to the first memory, wherein said input ports in said reference block memory array portion allow loading of the reference block memory array portion with reduced latency.

14. The system of claim 13, further comprising:
a plurality of data channels coupled between the output ports of the first memory and said input ports of the reference block memory array portion;
wherein the data channels transfer reference block pixels from the first memory to the reference block memory array portion with reduced loading latency.

15. The system of claim 1,
wherein the motion estimation array performs a sum of absolute errors block matching.

16. A method for performing motion estimation between a reference frame and a search frame, the method comprising:
storing a reference frame in a first memory;
storing a search frame in a second memory;
transfering reference block from the first memory to a reference block memory array portion of a motion estimation array;
transfering candidate block from said second memory to a candidate block memory array portion of said motion estimation array, wherein said transfering said candidate block comprises transferring pixel data from said second memory to said candidate block memory array portion utilizing one or more channels; and
the motion estimation array performing comparisons between pixel data in the reference block stored in the reference block memory array portion and pixel data in the candidate block stored in the candidate block memory array portion; and
propagating pixel data in a pipeline fashion to form a new candidate block through the motion estimation array in the candidate block memory array portion after said performing comparisons; and
the motion estimation array performing comparisons between pixel data in the reference block in the reference block memory array portion and pixel data in the new candidate block in the candidate block memory array portion after said step of propagating pixel data in a pipeline fashion to form a new candidate block; and
repeating said steps of propagating pixel data in a pipeline fashion to form a new candidate block and performing comparisons between said pixel data in said reference block and said pixel data in said new candidate block, wherein said repeating is performed for a plurality of candidate blocks in a column of a search window of said search frame; and
repeating said step of transferring a candidate block from said second memory to a candidate block memory array portion of said motion estimation array for a plurality of columns of said search window of said search frame, wherein said repeating said step of transferring sad candidate block comprises transfering pixel data from said second memory to said candidate block memory array portion utilizing one or more channels for each of said columns of said search window of said search frame;
wherein said performing comparisons between pixel data in said reference block in the reference block memory array portion and pixel data in the new candidate block in the candidate block memory array portion are performed in a single clock cycle.

17. The method of claim 16, wherein said transferring said reference block comprises transferring pixel data from said first memory to said reference block memory array portion utilizing multiple channels.

18. The method of claim 17, wherein said propagating pixel data in a pipeline fashion to form a new candidate block comprises:

shifting said pixel data stored in said candidate block memory array portion downward; and loading new pixel data from said search window into a portion of said candidate block memory array portion, thereby effectively forming a new candidate block stored in said candidate block memory array portion.

19. The method of claim 16, wherein the motion estimation array comprises a plurality of hardware modules which perform block matching computations, wherein each of said hardware modules comprises a plurality of cells which perform comparisons between a plurality of pixels from the reference block and a plurality of pixels from the candidate block, wherein each cell comprises a plurality of reference block memory elements for storing a plurality of reference block pixels, and wherein each cell comprises a plurality of candidate block memory elements for storing a plurality of candidate block pixels;

wherein said transferring a candidate block from said second memory to a candidate block memory array portion of said motion estimation array comprises loading each of said cells in parallel for reduced loading latency.

20. The method of claim 19, wherein each of the candidate block memory elements in at least a subset of cells is controllable to load a pixel value from a neighboring candidate block memory element, or to load a pixel value from a candidate block memory element in a corresponding location of an adjacent cell;

wherein said transferring a candidate block from said second memory to a candidate block memory array portion further comprises loading a pixel value from a candidate block memory element in a corresponding location of an adjacent cell during said one or more initialization cycles for each of said candidate block memory elements in at least a subset of cells; and wherein said receiving pixel data to form a new candidate block in said candidate block memory array portion comprises loading a pixel value from a neighboring candidate block memory element during computation cycles for each of said candidate block memory elements in said at least a subset of cells.

21. The method of claim 19, wherein said transferring a reference block from the first memory to said reference block memory array portion of said motion estimation array comprises loading each of said reference block memory elements in said cells in parallel during said initialization cycles for reduced loading latency.

22. The method of claim 21, wherein each of the reference block memory elements in at least a subset of cells is controllable to maintain its pixel value, or to load a pixel value from a reference block memory element in a corresponding location of an adjacent cell;

wherein said transferring a reference block from the first memory to said reference block memory array portion of said motion estimation array comprises loading a pixel value from a reference block memory element in a corresponding location of an adjacent cell during said initialization cycles for each of the reference block memory elements in said at least a subset of cells.

23. The method of claim 19, wherein said storing a search frame in said second memory comprises:

storing a first field of pixel data in a first portion of the second memory; and storing a second field of pixel data in a second portion of the second memory;

wherein said motion estimation array is operable in a frame mode for receiving and comparing pixel data from said first and second fields of pixel data, wherein in said frame mode said transferring a candidate block from said second memory to said candidate block memory array portion of said motion estimation array comprises:

transferring pixel data from said first field from said first portion of the second memory to said candidate block memory array portion; and transferring pixel data from said second field from said second portion of the second memory to said candidate block memory array portion.

24. The method of claim 23, wherein said transferring pixel data from said first field from said first portion of the second memory to said candidate block memory array portion comprises transferring pixel data from said first portion of said second memory to a first plurality of said candidate block memory elements; and wherein said transferring pixel data from said second field from said second portion of the second memory to said candidate block memory array portion comprises transferring pixel data from said second portion of said second memory to a second plurality of said candidate block memory elements;

wherein said transferring pixel data from said first field and said transferring pixel data from said second field occurs simultaneously.

25. The method of claim 23, wherein said first field comprises pixel data from a first plurality of horizontal scan lines of said search frame, and wherein the second field comprises pixel data from a second plurality of horizontal scan lines of said search frame.

26. The method of claim 19, wherein said storing a search frame in said second memory comprises:

storing a first field of pixel data in a first portion of the second memory; and storing a second field of pixel data in a second portion of the second memory;

wherein said motion estimation array is operable in a field mode for receiving and comparing pixel data from only one of either of said first field or said second field of pixel data, wherein in said field mode said transferring a candidate block from said second memory to said candidate block memory array portion of said motion estimation array comprises:

transferring pixel data from only one of either of said first field or said second field to said candidate block memory array portion.

* * * * *

UNITED STATES PATENT AND TRADEMARK OFFICE
CERTIFICATE OF CORRECTION

PATENT NO. : 5,973,742

DATED : October 26, 1999

INVENTOR(S) : Gardyne et al.

It is certified that error appears in the above-identified patent and that said Letters Patent is hereby corrected as shown below:

Claim 16, col. 22, line 53, please delete "sad" and substitute --said--.

Signed and Sealed this

Second Day of May, 2000

Attest:

Q. TODD DICKINSON

*Attesting Officer*  *Director of Patents and Trademarks*